(12) United States Patent
Knight

(10) Patent No.: US 7,194,853 B1
(45) Date of Patent: Mar. 27, 2007

(54) PRESSURIZER FOR A ROCKET ENGINE

(76) Inventor: Andrew F. Knight, 2521 Glengyle Dr., Vienna, VA (US) 22181

( * ) Notice: Subject to any disclaimer, the term of this patent is extended or adjusted under 35 U.S.C. 154(b) by 309 days.

(21) Appl. No.: 10/852,761

(22) Filed: May 25, 2004

Related U.S. Application Data

(63) Continuation-in-part of application No. 10/629,685, filed on Jul. 30, 2003, now Pat. No. 7,082,750, which is a continuation-in-part of application No. 10/214,706, filed on Aug. 9, 2002, now Pat. No. 6,751,945, which is a continuation-in-part of application No. 09/878,293, filed on Jun. 12, 2001, now Pat. No. 6,499,288.

(51) Int. Cl.
*F02K 9/00* (2006.01)
*F02K 9/42* (2006.01)
*F02K 9/72* (2006.01)

(52) U.S. Cl. .................... 60/259; 417/137; 417/393

(58) Field of Classification Search ........... 60/201, 60/257, 259; 417/64, 392, 393, 137
See application file for complete search history.

(56) References Cited

U.S. PATENT DOCUMENTS

| | | | |
|---|---|---|---|
| 2,505,798 A | | 5/1950 | Skinner |
| 2,701,441 A | | 2/1955 | Mitchell |
| 3,209,986 A | | 10/1965 | Kentfield |
| 3,213,804 A | | 10/1965 | Sobey |
| 3,945,203 A | | 3/1976 | Kayser |
| 4,381,180 A | * | 4/1983 | Sell ............................ 417/393 |
| 4,548,551 A | * | 10/1985 | Ruttenberg et al. ......... 417/393 |
| 4,880,185 A | | 11/1989 | Apfel |
| 5,205,722 A | * | 4/1993 | Hammond .................. 417/395 |
| 5,279,504 A | * | 1/1994 | Williams .................... 417/393 |
| 5,362,212 A | * | 11/1994 | Bowen et al. .............. 417/395 |
| 5,471,833 A | | 12/1995 | Pahl |
| 5,649,813 A | * | 7/1997 | Able et al. .................. 417/387 |
| 5,707,217 A | * | 1/1998 | Loeffler ...................... 417/339 |
| 5,839,463 A | | 11/1998 | Blackmon et al. |
| 6,213,348 B1 | | 4/2001 | Le Grouyellec |
| 6,314,978 B1 | | 11/2001 | Lanning et al. |
| 6,435,843 B1 | * | 8/2002 | Hur ............................. 417/393 |

OTHER PUBLICATIONS

Steve Harrington, "Pistonless Dual Chamber Rocket Fuel Pump," AIAA-LA Section/SSTC Responsive Space Conference 2003-6003.
Steve Harrington, "Pistonless Dual Chamber Rocket Fuel Pump: Testing and Performance," AIAA Paper 2003-4479.
Steve Harrington, "Launch Vehicle and Spacecraft System Design Using the Pistonless Pump," AIAA 2nd Responsive Space Conference 2004-7004.

(Continued)

*Primary Examiner*—William H. Rodriguez

(57) ABSTRACT

A pump for pressurizing a fluid includes an engine portion including a first pressure vessel, a first piston movable inside the first pressure vessel, at least two pressurant entrance valves connected to the first pressure vessel, and at least two pressurant exit valves connected to the first pressure vessel. The valves are configured to be opened and closed automatically and directly as a function of a position of the first piston inside the first pressure vessel. The valves are also configured to be automatically opened and closed out of phase with each other. The pump also includes a pump portion including a second pressure vessel, a second piston connected to the first piston and movable inside the second pressure vessel, at least two fluid entrance valves connected to the second pressure vessel, and at least two fluid exit valves connected to the second pressure vessel.

20 Claims, 18 Drawing Sheets

OTHER PUBLICATIONS

J.C. Whitehead, "Mars Ascent Propulsion Options for Small Sample Return Vehicles," Jul. 1997, AIAA 97-2950.

J.C. Whitehead et al, "Pumped Hydrazine Miniaturized Propulsion System," Jul. 1989, AIAA 89-2958.

J.C. Whitehead, "Free Piston Pumps for Miniature Rocket Propulsion," Jun. 1991, AIAA 91-1837.

J.C. Whitehead, "Demand thrust Pumped Propulsion with Automatic Warm Gas Valving," Jul. 1992, AIAA 92-3539.

J.C. Whitehead, "Test Results for a Reciprocating Pump Powered by Decomposed Hydrogen Peroxide," Jul. 2001, AIAA-2001-3839.

J.C. Whitehead, "Hydrogen Peroxide Gas Generator Cycle with a Reciprocating Pump," Jul. 2002, AIAA 2002-3702.

J.C. Whitehead et al, "Design and Flight Testing of a Reciprocating Pump Fed Rocket," Jun. 1994, AIAA 94-3031.

D.E. Eddleman et al, "Reciprocating Feed System for Advanced Space Propulsion Systems," Apr. 2004, AIAA Student Conference.

W. Hammack, "XCOR Aerospace Announces New Rocket Engine Pump Design," Apr. 27, 2002, www.xcor.com.

W. Hammack, "XCOR Passes Major Milestone on DARPA Piston Pump Contract," Sep. 26, 2003, www.xcor.com.

* cited by examiner

PRESSURIZER FOR A ROCKET ENGINE

REFERENCE TO RELATED APPLICATIONS

This application is a Continuation-in-Part (CIP) of U.S. patent application Ser. No. 10/629,685, entitled "Pressurizer For a Rocket Engine," filed Jul. 30, 2003 (now U.S. Pat. No. 7,082,750), which is a CIP of U.S. patent application Ser. No. 10/214,706, entitled "Pressurizer For a Rocket Engine," filed Aug. 9, 2002 (now U.S. Pat. No. 6,751,945), which is a CIP of U.S. patent application Ser. No. 09/878,293, entitled "Pressurizer For a Rocket Engine," filed Jun. 12, 2001 (now U.S. Pat. No. 6,499,288), the disclosures of which are herein incorporated by reference.

BACKGROUND

Rocket engines require propellants to be fed to them at very high pressures. This has historically been accomplished in two general ways: first, with the use of a pressurized fluid, such as high pressure helium; and second, with the use of a pump.

In the first way (e.g., a "blowdown" system), a pressurized fluid, such as helium, is added directly to the propellant tank and exerts a force on the propellant. The problem with this method, however, is that the pressurized fluid also exerts a force on the propellant tank. Because of the extremely high pressures required of the pressurized fluid, the walls of the propellant tank must be thick enough to withstand the pressure. The propellant tank is therefore very heavy. Rockets employing the pressurized fluid must use a greater proportion of their thrust lifting this extra weight, and therefore they are not as efficient as rockets that do not require this added weight.

Historically, one way to solve the above weight problem is with the use of a pump. Pumps (e.g., reciprocating, centrifugal, or radial pumps) are generally very complex and expensive and require their own driving means, such as an engine. Further, the engine driving the pump burns a significant percentage of the total propellant. For small rocket engine systems, since a pump is too complicated and too expensive, pressurized fluids are generally used to pressurize the propellant. However, for large rocket engine systems, pumps have the advantage that the walls of the propellant tank need not be thick, since there is little pressure in the tank. Therefore, the propellant tank is much lighter, and the added weight of the pump is more than offset by the reduction in propellant tank weight.

U.S. Pat. No. 3,213,804 to Sobey ("Sobey") discloses fluid pressure accumulators that are connected to sources of low and high pressure by means of valves. Essentially, the pressurized fluid exerts force on the propellant in small, designated storage tanks. While the walls of these containers must be thick in order to withstand the high pressure of the pressurized fluid, the walls of the propellant tank need not be. Therefore, the total weight of the rocket engine system employing Sobey's invention may be less than that of the previously discussed rocket engine system because these storage tanks (fluid pressure accumulators) are small in comparison to the propellant tanks.

U.S. Pat. No. 6,314,978 to Lanning, et al. ("Lanning") discloses a reciprocating feed system for fluids having storage tanks 1, 2, 3 that are similar in purpose to the fluid pressure accumulators disclosed in Sobey. Instead of valves 50, 52, 54 disclosed in Sobey, Lanning discloses four valves for each storage tank 1, 2, 3. For example, associated with storage tank 1 are: valve 13 between storage tank 1 and low pressure fluid 5; valve 16 between storage tank 1 and high pressure discharge 7; valve 20 between storage tank 1 and vent manifold 18; and valve 24 between storage tank 1 and pressurized gas supply 8. Each valve must be accurately and reliably controlled by a controller 11. Further, each valve may have an associated sensor 11a.

SUMMARY OF THE INVENTION

A problem with the Sobey and Lanning systems is that neither is applicable to an expander cycle or staged combustion cycle. Therefore, efficient pressurant gas usage is of the highest importance, because expanded pressurant is exhausted without further combustion or providing thrust. There is a need for a low-mass, low-cost positive displacement piston pump applicable to an expander cycle or staged combustion cycle.

Another problem with the Sobey and Lanning systems is that both require an externally controlled valving mechanism that may add additional mass and complexity to the systems.

The present invention aims to solve one or more of these and other problems.

According to one embodiment, a pump for pressurizing a fluid comprises: an engine portion, the engine portion comprising: a first pressure vessel; a first piston movable inside the first pressure vessel; at least two pressurant entrance valves connected to the first pressure vessel; and at least two pressurant exit valves connected to the first pressure vessel, wherein the valves are configured to be at least one of opened and closed automatically and directly as a function of a position of the first piston inside the first pressure vessel, wherein the at least two pressurant entrance valves are configured to be automatically opened and closed out of phase with each other, and wherein the at least two pressurant exit valves are configured to be automatically opened and closed out of phase with each other; and a pump portion, the pump portion comprising: at least one second pressure vessel; at least one second piston connected to the first piston and movable inside the at least one second pressure vessel; at least two fluid entrance valves connected to the at least one second pressure vessel; and at least two fluid exit valves connected to the at least one second pressure vessel, wherein the at least two fluid entrance valves are configured to be automatically opened and closed out of phase with each other, and wherein the at least two fluid exit valves are configured to be automatically opened and closed out of phase with each other.

In one aspect, the pump portion comprises: two second pressure vessels; and two second pistons connected to the first piston, one second piston movable inside one second pressure vessel and the other second piston movable inside the other second pressure vessel, wherein one of the at least two fluid entrance valves and one of the at least two fluid exit valves are connected to the one second pressure vessel, and wherein the other of the at least two fluid entrance valves and the other of the at least two fluid exit valves are connected to the other second pressure vessel.

According to one embodiment, a rocket engine system comprises: a pump as described herein; and an impulse reaction engine connected to the pump and comprising a regenerative cooling portion and a propellant injector, wherein the system is configured to utilize at least one of an expander cycle and a staged combustion cycle, whereby for the expander cycle: fluid pumped from at least one of the at least two fluid exit valves is passed through and vaporizes in the regenerative cooling portion; the vaporized fluid is expanded in the engine portion; and the expanded vaporized fluid is injected into the impulse reaction engine via the propellant injector, and whereby for the staged combustion cycle: fluid pumped from at least one of the at least two fluid exit valves is passed through and vaporizes in the regenerative cooling portion; the vaporized fluid is reacted with another chemical in a chemical reactor to form a hot product gas; the hot product gas is expanded in the engine portion; and the expanded hot product gas is injected into the impulse reaction engine via the propellant injector.

In one aspect, at least one of the fluid entrance valves and fluid exit valves has a total flow cross sectional area that is at least one-fourth of a maximum cross sectional area of the second pressure vessel in a direction perpendicular to a movement direction of the second piston. In one aspect, at least one of the pressurant entrance valves and pressurant exit valves has a total flow cross sectional area that is at least one-tenth of a maximum cross sectional area of the first pressure vessel in a direction perpendicular to a movement direction of the first piston.

In one aspect, at least one of the fluid entrance valves and fluid exit valves comprises a plurality of separate check valves. In one aspect, at least one of the pressurant entrance valves and pressurant exit valves comprises a plurality of separate flow holes and a moving valving member configured to restrict flow through the plurality of separate flow holes simultaneously.

In one aspect, each of the pressurant entrance valves and pressurant exit valves comprises a hole, a movable valving member, and a linkage configured to mechanically communicate a position signal from the first piston to the movable valving member.

In one aspect, each of the pressurant entrance valves and pressurant exit valves comprises a hole and a movable valving member, and wherein the first piston comprises a common valving member comprising the movable valving members. In one aspect, the first pressure vessel comprises, for each of the pressurant entrance valves and pressurant exit valves, at least one vessel hole corresponding to the each valve, and wherein the first piston comprises, for the each valve, at least one piston hole corresponding to the each valve, wherein a reciprocating motion of the first piston causes the each valve to open and close by aligning and misaligning corresponding vessel and piston holes of the each valve.

In one aspect, the first piston has a cross section having a center portion and at least two extensions, wherein the center portion is configured to separate the first pressure vessel into two substantially continuously changing volumes, wherein at least two of the piston holes are located on opposing ones of the at least two extensions. In one aspect, the first pressure vessel comprises at least one protrusion, the protrusion located at an end of the first pressure vessel and protruding past an end of at least one of the extensions and toward the center portion.

In one aspect, a dead volume of the engine portion is less than approximately one-half a working volume of the engine portion. In one aspect, a dead volume of the engine portion is at least approximately one-half a working volume of the engine portion According to an embodiment, a rocket engine system comprises: a pump as described herein; an impulse reaction engine connected to the pump; and a gas generator configured to generate hot product gas, wherein the system is configured to utilize a gas generator cycle, whereby: fluid pumped from at least one of the at least two fluid exit valves is reacted with another chemical in the gas generator to form the hot product gas; the hot product gas is expanded in the engine portion; and the expanded hot product gas is exhausted without substantially further reacting in the impulse reaction engine.

In one aspect, the engine portion is configured so that a flow direction of pressurant through the engine portion is substantially perpendicular to a movement direction of the first piston inside the first pressure vessel.

In one aspect, at least one of the pressurant entrance valves and pressurant exit valves has a total flow cross sectional area that is at least one-fourth of a maximum cross sectional area of the first pressure vessel in the direction perpendicular to the movement direction of the first piston.

According to one embodiment, an air-breathing impulse reaction engine system comprises: a pump as described herein; and an impulse reaction engine connected to the pump, wherein the first piston has an area different from the at least one second piston, wherein the pump is configured to pump air to a high pressure, wherein air pumped from at least one of the at least two fluid exit valves is at least one of: heated by a reaction inside the impulse reaction engine; and reacted with another chemical to generate a hot product gas, and wherein at least one of the heated air and the hot product gas is expanded in the engine portion.

According to one embodiment, a rocket engine system comprises: a) a pump for pressurizing a fluid, the pump comprising: an engine portion, the engine portion comprising: a first pressure vessel; a first piston movable inside the first pressure vessel; at least two pressurant entrance valves connected to the first pressure vessel; and at least two pressurant exit valves connected to the first pressure vessel, wherein the valves are configured to be at least one of opened and closed automatically and directly as a function of a position of the first piston inside the first pressure vessel, wherein the at least two pressurant entrance valves are configured to be automatically opened and closed out of phase with each other, and wherein the at least two pressurant exit valves are configured to be automatically opened and closed out of phase with each other; and a pump portion, the pump portion comprising: at least one second pressure vessel; at least one second piston connected to the first piston and movable inside the at least one second pressure vessel; at least two fluid entrance valves connected to the at least one second pressure vessel; and at least two fluid exit valves connected to the at least one second pressure vessel, wherein the at least two fluid entrance valves are configured to be automatically opened and closed out of phase with each other, and wherein the at least two fluid exit valves are configured to be automatically opened and closed out of phase with each other, wherein the first pressure vessel comprises, for each of the pressurant entrance valves and pressurant exit valves, at least one vessel hole corresponding to the each valve, and wherein the first piston comprises, for the each valve, at least one piston hole corresponding to the each valve, wherein a reciprocating motion of the first piston causes the each valve to open and close by aligning and misaligning corresponding vessel and piston holes of the each valve, wherein the first piston has a cross section having a center portion and at least two extensions, wherein the center portion is configured to separate the first pressure vessel into two substantially continuously changing volumes, wherein at least two of the piston holes are located on opposing ones of the at least two extensions, and wherein the engine portion is configured so that a flow direction of pressurant through the engine portion is substantially perpendicular to a movement direction of the first piston inside the first pressure vessel; and b) an impulse reaction engine connected to the pump and comprising a regenerative cooling portion and a propellant injector, wherein the system is configured to utilize at least one of an expander cycle and a staged combustion cycle, whereby for the expander cycle: fluid pumped from at least one of the at least two fluid exit valves is passed through and vaporizes in the regenerative cooling portion; the vaporized fluid is expanded in the engine portion; and the expanded vaporized fluid is injected into the impulse reaction engine via the propellant injector, and whereby for the staged combustion cycle: fluid pumped from at least one of the at least two fluid exit valves is passed through and vaporizes in the regenerative cooling portion; the vaporized fluid is reacted with another chemical in a chemical reactor to form a hot product gas; the hot product gas is expanded in the engine portion; and the expanded hot product gas is injected into the impulse reaction engine via the propellant injector.

According to one embodiment, a pump for pressurizing a fluid comprises: an engine portion, the engine portion comprising: a first pressure vessel and a second pressure vessel; a first piston movable inside the first pressure vessel and a second piston movable inside the second pressure vessel, the second piston connected to the first piston; a first pressurant entrance valve connected to the first pressure vessel and a second pressurant entrance valve connected to the second pressure vessel; and a first pressurant exit valve connected to the first pressure vessel and a second pressurant exit valve connected to the second pressure vessel, wherein the valves are configured to be at least one of opened and closed automatically and directly as a function of positions of the first and second pistons inside the first and second pressure vessels, wherein the at least two pressurant entrance valves are configured to be automatically opened and closed out of phase with each other, and wherein the at least two pressurant exit valves are configured to be automatically opened and closed out of phase with each other; and a pump portion, the pump portion comprising: at least one third pressure vessel; at least one third piston connected to the first and second pistons and movable inside the at least one third pressure vessel; at least two fluid entrance valves connected to the at least one third pressure vessel; and at least two fluid exit valves connected to the at least one third pressure vessel, wherein the at least two fluid entrance valves are configured to be automatically opened and closed out of phase with each other, and wherein the at least two fluid exit valves are configured to be automatically opened and closed out of phase with each other.

BRIEF DESCRIPTION OF THE DRAWINGS

FIG. 4b is a cross sectional view through section A—A of the engine portion shown in FIG. 4a.

DETAILED DESCRIPTION

In the following description, the use of "a," "an," or "the" can refer to the plural. All examples given are for clarification only, and are not intended to limit the scope of the invention.

Figure 1:
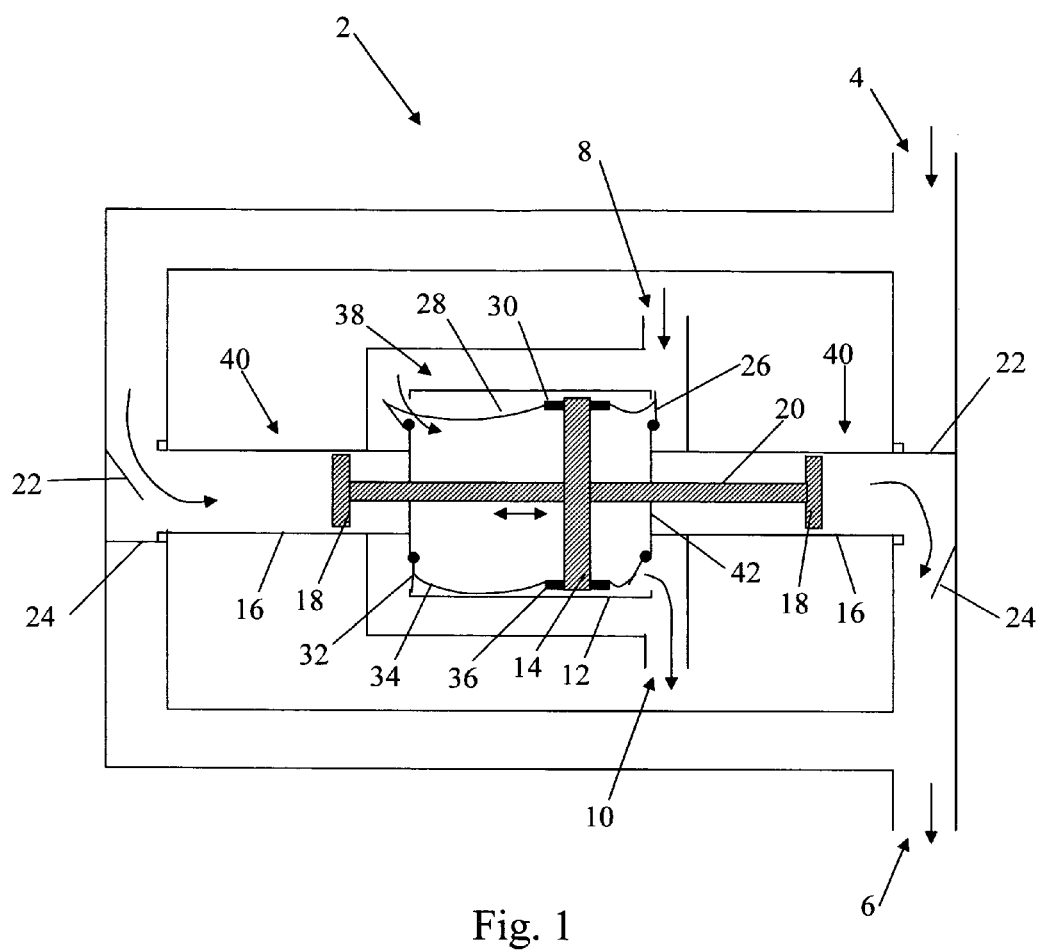
FIG. 1 is a cross sectional view of a piston pump according to an embodiment of the present invention.

Referring now to FIG. 1, a piston pump 2 comprises a low-pressure fluid inlet 4, a high-pressure fluid outlet 6, a pressurant inlet 8, a pressurant outlet 10, a first pressure vessel 12 containing a preferably linearly movable first piston 14, and preferably two second pressure vessels 16 each containing a preferably linearly movable second piston 18, where the first piston 14 is connected to the two second pistons 18 via two connecting rods 20. Thus, all three pistons 14, 18 are movable together in the linear directions indicated by the array. The first and second pressure vessels 12, 16 are separated by walls 42, through which connecting rods 20 may slide with a relatively tight seal, to prevent pressurant located within the first pressure vessel 12 from leaking to one of the second pressure vessels 16. First piston 14 is preferably larger in area than second pistons 18, although may be the same size or smaller. Depending on the sizes of pistons 14, 18, walls 42 may not be required at all. Pistons 14, 18 have relatively tight seals in their respective vessels 12, 16, so as to prevent substantial leakage from one side of the pistons 14, 18 to the other.

The piston pump 2 further comprises fluid entrance valves 22, preferably configured as check valves, fluidly separating each second pressure vessel 16 from the fluid inlet 4, and fluid exit valves 24, also preferably configured as check valves, fluidly separating each second pressure vessel 16 from the fluid outlet 6. The piston pump 2 further comprises pressurant entrance valves 26 fluidly separating the first pressure vessel 12 from the pressurant inlet 8, and pressurant exit valves 32 fluidly separating the first pressure vessel 12 from the pressurant outlet 10. Valves 22, 24, 26, 32 may be configured as any valves known in the art, including but not limited to check, pneumatic, hydraulic, mechanical, electric (e.g., solenoid valves), and of any type (e.g., ball, plate, etc.). In a preferred embodiment, opening and/or closing of the valves 26, 32 occurs automatically and directly as a function of the position of the first piston 14 inside the first pressure vessel 12. For example, the valves 26, 32 may be directly mechanically (or electrically, pneumatically, etc.) linked to the first piston 14, or the first piston 14 may comprise a portion (e.g., a movable valving member) of the valves 26, 32, so that the motion of the first piston 14 itself directly causes opening and/or closing of the valves 26, 32.

In the example shown in FIG. 1, each valve 26, 32 is a mechanically actuated valve having a valving member rotatable about an axis. The first piston 14 comprises valve actuators 30, preferably one for each valve 26, connected to their respective valves 26 via linkages 28. As shown and understood by one of ordinary skill in the art, each actuator 30 is configured to open its respective valve 26 when the first piston 14 comes within a predetermined distance of the respective valve 26—e.g., the actuator 30 may push the valving member. Further, each linkage 28 is configured to close its respective valve 26 when the first piston 14 moves away from the respective valve 26 another predetermined distance—e.g., the piston 14 may pull the respective valve 26 closed via tension in the linkage 28. The first piston 14 also comprises valve actuators 36, preferably one for each valve 32, connected to their respective valves 32 via linkages 34. These actuators/linkages/valving members operate in a similar manner to those described with respect to the valves 26, except in an opposite manner—i.e., each valve 32 is configured to automatically close when first piston 14 moves within a predetermined distance of the valve 32 (by actuator 36 pushing against valve 32), and is configured to automatically open when the first piston 14 moves away from the valve 32 by another predetermined distance (by first piston 14 pulling on the valve 32 via linkage 34).

Shown in FIG. 1, linkages 28, 34 are string-like or cable-like objects that may be retractable in the first piston 14 and/or respective actuators 30, 36. As understood by one of ordinary skill in the art, linkages 28, 34 may be any device that allows the first piston 14 to open and/or close valves 26, 32 as a function of its position, and may be configured to not get in the way of the movement of first piston 14. In a preferred embodiment, valves 26, 32 are configured to open and close automatically and directly as a function of the position of the first piston 14 inside the first pressure vessel 12. In other words, the opening and closing of valves 26, 32 is directly caused by movement of the first piston 14, either because the first piston 14 itself includes one or more valving members (as discussed with respect to FIG. 4a) of valves 26, 32, or because the first piston 14 is linked to the valving members of the valves 26, 32 via one or more linkages.

In another embodiment, only the opening or the closing of the valves 26, 32 is directly caused by movement of the first piston 14 inside the first pressure vessel 12. For example, instead of using linkages 28, valves 26 may be configured to remain open for a predetermined time, such that when the valves 26 are pushed open by actuators 30, valves 26 remain open for the predetermined time (which is preferably chosen as approximately the time for the first piston 14 to traverse the length of the first pressure vessel 12), after which time they close. Alternatively or in addition, instead of using linkages 34, valves 32 may be configured to remain closed for a predetermined time, such that when the valves 32 are pushed closed by actuators 36, valves 32 remain closed for the predetermined time (which is preferably chosen as approximately the time for the first piston 14 to traverse the length of the first pressure vessel 12), after which time they open.

Of course, very mechanically simple examples of linkages/actuators 28/30 are shown for ease of explanation. The scope of the present invention includes any known valving mechanism that automatically opens and/or closes directly depending on a position of the first piston 14. An engine portion 38 comprises the first piston 14, first pressure vessel 12, and valves 26, 32, while pump portion 40 comprises second pistons 18, second pressure vessels 16, and valves 22, 24.

In operation, a high-pressure pressurant is fed into pressurant inlet 8. The pressurant may be a liquid fluid, such as a hydraulic fluid or oil, but is preferably a high-pressure gas that can do useful work by expansion. The high-pressure gas may be a pressurized gas, such as pressurized helium or other relatively inert gas, or may be the products of combustion, such as hot product gases from a gas generator or a staged combustion cycle, or may be the hot vapor resulting from boiling a fluid in a heat exchanger (such as in an expander cycle). Further, a preferably liquid fluid, such as a reactive propellant for rocket applications, is plumbed into the fluid inlet 4. As shown in FIG. 1, the pistons 14, 18 (connected by connecting rods 20) are moving to the right. The left pressurant entrance valve 26 is open, allowing high-pressure pressurant to fill into the volume of the first pressure vessel 12 to the left of first piston 14 (as shown by the arrow), and the left pressurant exit valve 32 remains closed to prevent the high-pressure gas in the left volume from exhausting without doing useful work on first piston 14. Further, right pressurant exit valve 32 is also open, while the right pressurant entrance valve 26 remains closed, so that the pressure in the volume to the right of first piston 14 may remain close to the pressure at the pressurant outlet 10 (which may be atmospheric pressure, vacuum pressure, or a pressure above an injection pressure into a rocket engine injector). If the pressure in the right volume is lower than the pressure in the left volume (due to inflow of the high-pressure pressurant), then a net force is exerted on the first piston 14 in the right direction.

Assuming that some of the fluid from the fluid inlet 4 is located inside the right-hand second pressure vessel 16, then rightward movement of first piston 14 causes a corresponding rightward movement of the right-hand second piston 18, thus pushing the fluid located therein to move also to the right. Fluid entrance valve 22 is preferably configured to allow fluid to flow only into the second pressure vessel 16, and fluid exit valve is preferably configured to allow fluid to flow only out from the second pressure vessel 16, so that an outflow of fluid from the second pressure vessel 16, caused by rightward movement of the right-hand second piston 18, occurs only from the right-hand fluid exit valve 24 (as shown by the arrow), toward the fluid outlet 6. Further, rightward movement of first piston 14 causes a corresponding rightward movement of the left-hand second piston 18, thus sucking fluid located in the conduit between the fluid inlet 4 and the left-hand second pressure vessel 16 into the left-hand pressure vessel 16. Thus, an inflow of fluid to the left-hand second pressure vessel 16, caused by rightward movement of the left-hand second piston 18, occurs only from the left-hand fluid entrance valve 22 (as shown by the arrow), from the direction of the fluid inlet 4.

The process continues until the first piston 14 has reached the far right-hand side of the first pressure vessel 16, at approximately which point: a) right-hand actuator 30 pushes open right-hand pressurant entrance valve 26; b) right-hand actuator 36 pushes closed right-hand pressurant exit valve 32; c) left-hand linkage 28 pulls closed left-hand pressurant entrance valve 26; and d) left-hand linkage 34 pulls open left-hand pressurant exit valve 32. Of course, while these events may happen substantially at the same time, event c) may occur before event a), and event b) may occur before event d). Further, to prevent a "short circuit" flow of pressurant directly from a pressurant entrance valve 26 through a pressurant exit valve 32, event b) should occur before event a), and event c) should occur before event d).

At this point, high-pressure pressurant flows into the right volume of the first pressure vessel 12 via right-hand pressurant entrance valve 26, and pressurant exhausts from the left volume via left-hand pressurant exit valve 32, preferably causing a net force on the first piston 14 in the leftward direction. Now, the right-hand second piston 18 moves in the leftward direction, causing a sucking force that closes the right-hand fluid exit valve 24 and opens the right-hand fluid entrance valve 22, allowing fluid to flow into the right-hand second pressure vessel 16. Further, the left-hand second piston 18 also moves in the leftward direction, causing a pushing force that closes the left-hand fluid entrance valve 22 and opens the left-hand fluid exit valve 24, causing fluid to flow from the left-hand second pressure vessel 16 toward the fluid outlet 6. The process continues as pistons 14, 18 reciprocate in the direction indicated by the arrow, so that each stroke is a power stroke that pumps fluid from one of the second pressure vessels 16 toward the fluid outlet 6, thus ensuring a substantially continuous flow of fluid from the fluid outlet 6. Due to the time required for the pistons 14, 18 to decelerate and change directions at the end of each stroke, the system may experience flow fluctuations from the fluid outlet 6 that may be easily smoothed by using an accumulator (not shown, but well known in the art). Because the opening and closing of the valves 26, 32 depends directly on the position of the first piston 14, the pump operates self-sufficiently does not require external or intentional modulation of the valves.

Of course, while pistons 14, 18 are preferably linearly movable, they may also be movable in any reciprocating manner, such as in a semi-circular or other manner.

In a preferred embodiment, a total flow area of each of the fluid entrance valves 22 and fluid exit valves 24 is a substantial fraction (e.g., at least 1/10, at least 1/6, at least 1/4, at least 1/2, at least 75%, or at least 100%) of a maximum cross sectional area of the respective second pressure vessel 16 in a direction perpendicular to a movement of the respective second piston 18 inside the second pressure vessel 16. (Where the second pressure vessel 16 is cylindrical, the mentioned maximum cross sectional area is just the area of its circular cross section.) The total flow areas of preferred check valves will be discussed further with reference to FIGS. 9a and 9b. This feature, which may be applicable to any of the embodiments herein described, has the advantage of allowing very high propellant or fluid flow rates in a very small, lightweight pump 2.

Figure 2:
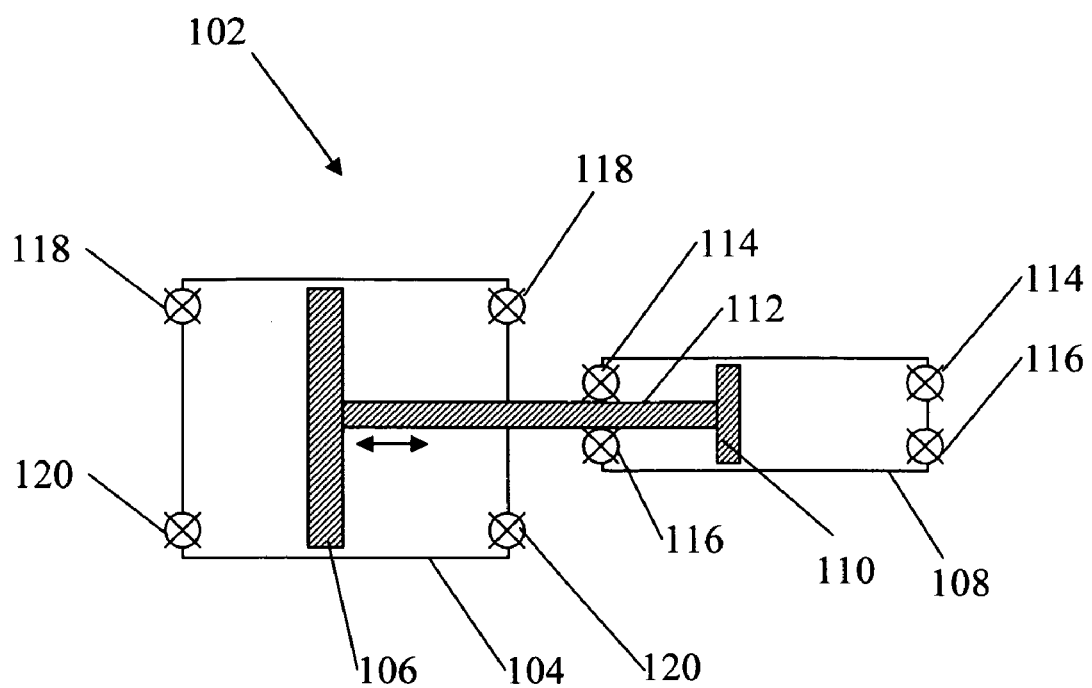
FIG. 2 is a cross sectional view of a piston pump according to another embodiment of the present invention.

Referring now to FIG. 2, a pump 102 according to another embodiment comprises a first pressure vessel 104 containing a first piston 106 preferably linearly movable therein, a second pressure vessel 108 containing a second piston 110 (preferably having a different area than first piston 106) preferably linearly movable therein and connected to the first piston 106 via a connecting rod 112. The second pressure vessel 108 comprises two fluid entrance valves 114 located on opposite ends of the second pressure vessel 108 (or at least opposite sides of the second piston 110), and two fluid exit valves 116 also located on opposite ends. As in the embodiment shown in FIG. 1, the valves 114, 116 may be check valves configured to deliver fluid toward a fluid outlet (not shown) from a fluid inlet (not shown). The first pressure vessel 104 comprises two pressurant entrance valves 118 located on opposite ends of the first pressure vessel 104 (or at least opposite sides of the first piston 106), and two pressurant exit valves 120 also located on opposite ends. Valves 118, 120 may be similar to the valves 26, 32 of FIG. 1, and may be of any type known (e.g., pneumatic, electric, hydraulic, mechanical), and are preferably configured to either open or close (or both) automatically and directly as a function of the position of the first piston 106 inside the first pressure vessel 104. The operation of the embodiment shown is similar to that of FIG. 1, except that the pump portion comprises a single piston 110 and a single pressure vessel 108.

Figure 3:
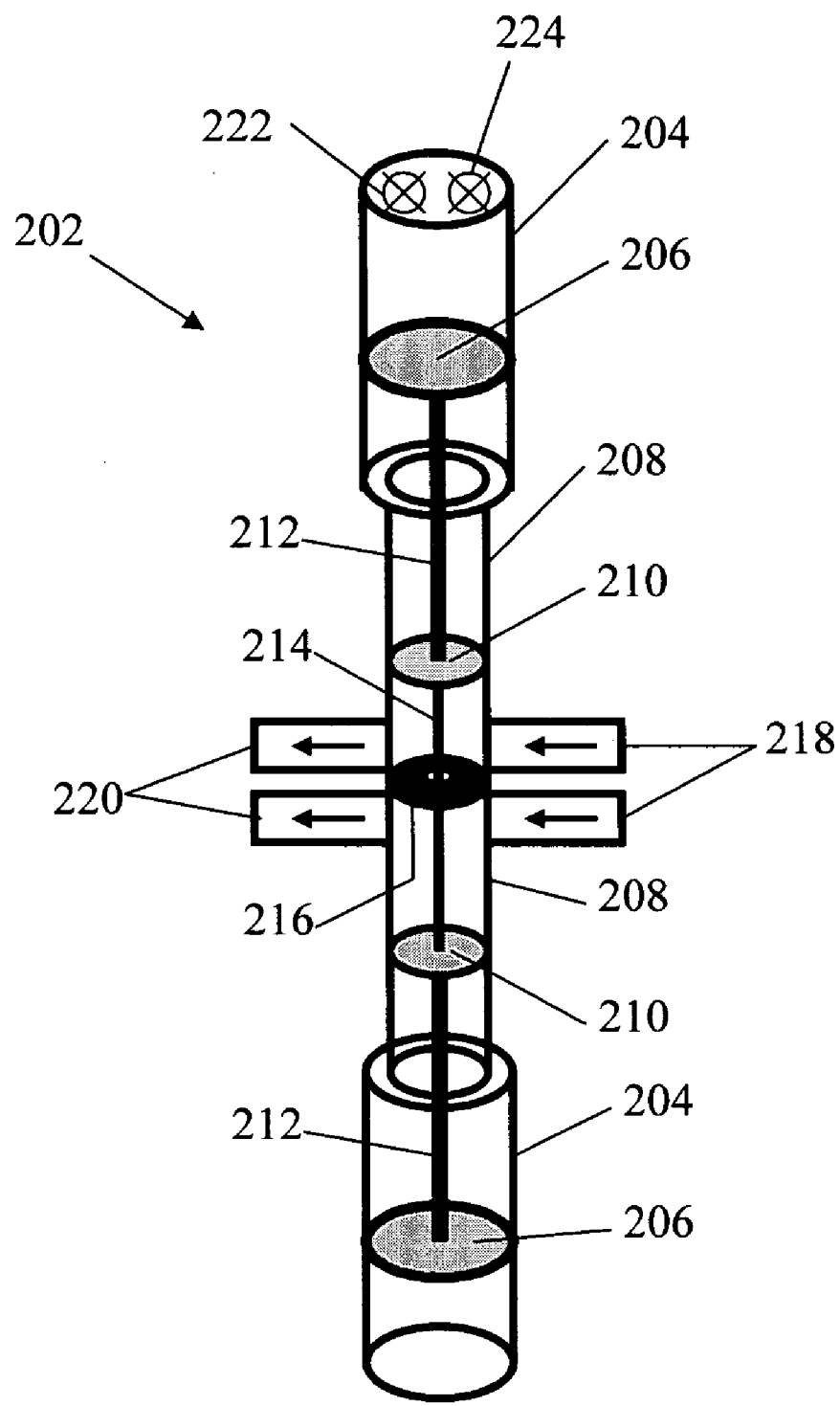
FIG. 3 is a perspective view of a piston pump according to another embodiment of the present invention.

Referring now to FIG. 3, a pump 202 according to another embodiment comprises two first pressure vessels 204, each first pressure vessel 204 containing a first piston 206 preferably linearly movable therein, and two second pressure vessels 208, each second pressure vessel 208 containing a second piston 210 preferably linearly movable therein. The second pistons 210 are connected by a second connecting rod 214 that is configured to tightly but comfortably (i.e., with low leakage and low friction) pass through a wall 216 so that second pistons 210 may move relative to second pressure vessels 208. Each first piston 206 is connected to an adjacent second piston 210 via a first connecting rod 212, such that all four pistons 206, 210 are movable together. Each second pressure vessel 208 comprises or has attached to it a fluid entrance valve 218 and a fluid exit valve 220, and each first pressure vessel 204 comprises or has attached to it a pressurant entrance valve 222 and a pressurant exit valve 224. Of course, valves 218, 220 are preferably check valves, and valves 222, 224 are preferably opened and/or closed automatically and directly as a function of a position of their respective first pistons 206 inside respective first pressure vessels 204. First pistons 206 preferably have a different area from second pistons 210, and may have different areas from each other. The operation of the embodiment shown is similar to that of FIG. 1, except that the engine portion comprises two pistons 206 and two pressure vessels 204, and the pump occurs "outside-in" instead of "inside-out."

Figure 4A:
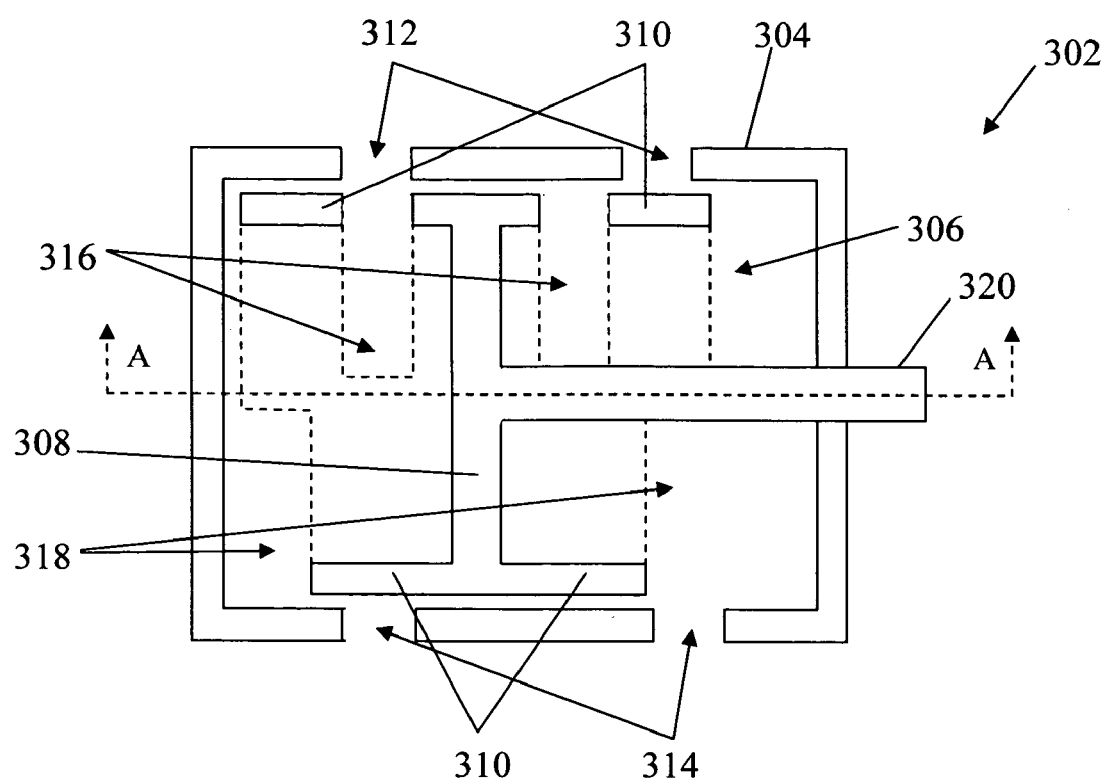
FIG. 4a is a cross sectional view of an engine portion of a piston pump according to an embodiment of the present invention.

Referring now to FIG. 4a, an engine portion 302 for a pump according to one embodiment may be utilized as the engine portion for any of the pumps discussed herein, such as the engine portion 38 of pump 2 shown in FIG. 1. The engine portion 302 comprises a pressure vessel 304 containing a piston 306 preferably linearly movable therein. A cross section of the piston 306 comprises a center portion 308 and extensions 310, the extensions 310 comprising holes 316, 318. The center portion 308 substantially separates a left volume of the pressure vessel 304 from a right volume. The engine portion 302 comprises pressurant entrance valves comprising holes 312 and movable valving members, the movable valving members formed by extensions 310. In other words, because extensions 310 comprise holes 316 corresponding to holes 312 in the pressure vessel 304, the combination of the piston 306 with each hole 312 forms a pressurant entrance valve that is "open" (i.e., capable of passing pressurant into the pressure vessel 304) when the respective hole 316 in extension 310 is aligned with the corresponding hole 312 in the pressure vessel 304, and is "closed" (i.e., capable of resisting flow of pressurant into the pressure vessel 304) when the respective hole 316 in extension 310 is misaligned with the corresponding hole 312 in the pressure vessel 304. In FIG. 4a, an example of an open pressurant entrance valve is shown on the left, with the alignment of the left-hand hole 312 in the pressure vessel 304 with the left-hand hole 316 in extension 310, and an example of a closed pressurant entrance valve is shown on the right, with the misalignment of the right-hand hole 312 in the pressure vessel 304 with the right-hand hole 316 in extension 310.

The engine portion 302 also comprises pressurant exit valves comprising holes 314 and movable valving members, the movable valving members also formed by extensions 310. In other words, because extensions 310 comprise holes 318 corresponding to holes 314 in the pressure vessel 304, the combination of the piston 306 with each hole 314 forms a pressurant exit valve that is "open" (i.e., capable of exhausting pressurant from the pressure vessel 304) when the respective hole 318 in extension 310 is aligned with the corresponding hole 314 in the pressure vessel 304, and is "closed" (i.e., capable of resisting exhaust of pressurant from the pressure vessel 304) when the respective hole 318 in extension 310 is misaligned with the corresponding hole 314 in the pressure vessel 304. In FIG. 4a, an example of an open pressurant exit valve is shown on the right, with the alignment of the right-hand hole 314 in the pressure vessel 304 with the right-hand hole 318 in extension 310, and an example of a closed pressurant exit valve is shown on the left, with the misalignment of the left-hand hole 314 in the pressure vessel 304 with the left-hand hole 318 in extension 310.

A connecting rod or engine shaft 320 is connected to the piston 306, preferably the center portion 308, and passes through an end wall of the pressure vessel 304, again relatively tightly but comfortably, so as to reduce leakage of pressurant and to minimize friction due to motion of the engine shaft 320 through the pressure vessel 304.

In operation, the engine portion begins in the configuration shown in FIG. 4a, and high-pressure pressurant flows into the left volume of the pressure vessel 304 through the aligned left-hand holes 312, 316. Meanwhile, pressurant is free to exhaust from the right volume through the aligned right-hand holes 314, 318, so that a net pressure differential causes a force on the center portion 308 of the piston 306 in the rightward direction. As the piston 306 moves to the right, the left-hand hole 316 of extension 310 becomes misaligned with the left-hand hole 312 of the pressure vessel 304, preventing further pressurant from flowing into the left volume of the pressure vessel 304 (event A), while right-hand hole 318 becomes misaligned with the right-hand hole 314, preventing further exhaust of pressurant from the right volume (event B). Next, right-hand hole 316 becomes aligned with right-hand hole 312, allowing high-pressure pressurant to flow into the right volume of the pressure vessel 304 (event C), and left-hand hole 318 becomes aligned with left-hand hole 314 to allow high-pressure pressurant in the left volume to exhaust (event D). Again, a pressure differential causes a net force on the center portion 308 in the leftward direction, causing the piston 306 to move leftward, and the process repeats (but in the opposite direction). Thus, the piston 306 automatically reciprocates to the left and right, where each stroke is a power stroke, and where the valving directly depends on the position of the piston 306 inside the pressure vessel 304—a requirement in this embodiment because the piston 306 itself comprises the movable valving members for each of the pressurant entrance and exit valves.

In the embodiment shown, left-hand holes 312, 314, 316, 318 are located approximately such that at certain times in the cycle, a direct short circuit path through all such holes exists. In a preferred embodiment, the left-hand (as well as right-hand) holes 312, 314, 316, 318 are aligned such that the left-hand pressurant exit valve is not opened (by aligning left-hand holes 314, 318) until left-hand pressurant entrance valve is closed (by aligning left-hand holes 312, 316), and so forth. In other words, event A preferably occurs before event D, and event B preferably occurs before event C. One of ordinary skill in the art will understand how to build piston 306 and pressure vessel 304 with respective holes 316, 318 and 312, 314 to achieve the desired valve timing.

In one embodiment, either the piston 306 or an object (e.g., a flywheel or other inertia carrying object) to which the piston 306 is attached contains sufficient inertia at the required or desired cycle time to cause the piston 306 to reciprocate over a sufficiently long movement length (i.e., preferably from one end of the pressure vessel 304 fully to the other end). This preference will be explained further. In the embodiment shown in FIG. 1, the valves/linkages/actuators were configured in such a way that the opening and closing cycles of the valves 26, 32 were offset from (or "out of phase with") the reciprocation cycle of the first piston 14, so that the first piston 14 is forced in one direction substantially throughout an entire stroke, after which the first piston 14 is forced in the other direction substantially throughout an entire stroke. However, in the embodiment shown in FIG. 4a, the piston 306 is forced in one direction for only half a stroke, approximately at which point the valving configuration reverses and the piston is forced in the other direction for the other half of the stroke. In other words, the valve timing cycles and the piston's reciprocation cycle are in phase. Such a configuration can provide a net output energy (i.e., it can expand the pressurant to extract useful work); however, it may require that the piston 306 (or a connected inertia-imparting object) has sufficient inertia to push the piston 306 to the end of its desired reciprocation length, against the force of the new resistive pressurant pressure, before the pressurant pressure reverses the piston's direction. Further, ends of the extensions 310 (or corresponding areas on the pressure vessel 304) may include impact absorption devices (e.g., springs, foams, rubbers, etc.) to absorb the energy of the impact of the piston 306 in case the piston 306 moves to quickly in its reciprocating motion.

In a preferred embodiment, cross sections of the piston 306 and the pressure vessel 304 in a direction perpendicular to a motion of the piston 306 are circular (although they may be of any shape, including oval, triangular, etc.)—i.e., the piston 306 and pressure vessel 304 are preferably cylindrical. The holes 312, 314, 316, 318 may be small holes (e.g., standard circular holes), or may be relatively large slices (as shown in FIG. 4a) so as to maximize their total individual flow areas. For example, the total flow area of each valve in an open configuration (e.g., the minimum flow area of left-hand holes 312 and 316 may represent the total flow area of the left-hand pressurant entrance valve) may be a large fraction (such as at least $1/20$, $1/10$, $1/7$, $1/4$, or $1/2$) of the maximum cross sectional area of the pressure vessel 304 in a direction perpendicular to a movement of the piston 306. Large flow areas allow each of the right and left volumes of the pressure vessel 304 to be pressurized with and subsequently exhausted of the pressurant at a very fast rate, allowing a minimization of the total engine cycle time (and thus a minimization of the pump's mass). Thus, this feature may be applicable to any of the embodiments described herein. This feature is further described with reference to FIG. 11.

The engine portion 302 may or may not include a gasket or o-ring or other leakage prevention device as currently known in the art (as may any of the structures discussed herein that are configured to prevent and/or minimize leakage of pressurant and/or fluid). However, if the engine portion 302 is part of a pump that is applied to an expansion or staged combustion cycle (discussed in more depth later), then leakage of pressurant from the pressurant entrance valves to the pressurant exit valves may or may not be a problem. For example, the piston 306 may be capable of free movement within the pressure vessel 304 without a gasket or seal, so that a predetermined gap exists between the piston 306 and pressure vessel 304. High-pressure pressurant may be able to flow within this gap, so that pressurant leaks from holes 312 to holes 314. However, in one of the above mentioned cycles, the pressurant comprises a vaporized and/or partially combusted form of one of the propellants (typically the fuel) which is subsequently ejected into the combustion chamber after expansion in the engine (usually a turbine). Thus, as long as the engine portion 302 extracts sufficient energy from the high-pressure pressurant to drive a pump portion capable of pumping the proper quantity(s) of propellant, "leakage" of pressurant doesn't much matter, because the leaked pressurant is fed directly to the rocket engine to combust further.

Further, in the embodiment shown in FIG. 4a, a flow direction of pressurant through the engine portion 302 may be substantially perpendicular to a movement direction of the piston 306 inside the pressure vessel 304. For example, because pressurant flows into the engine portion 302 via each of the pressurant entrance holes 312, downward through the respective extension holes 316, downward through the respective extension holes 318, and finally downward through the pressurant exit holes 314, the overall or effective flow direction of the pressurant through the engine portion 302 is downward, even though there may be some lateral (side-to-side) motion of the flow as the piston 306 reciprocates laterally. This downward motion is perpendicular to the reciprocating direction of the piston 306.

Figure 4B:
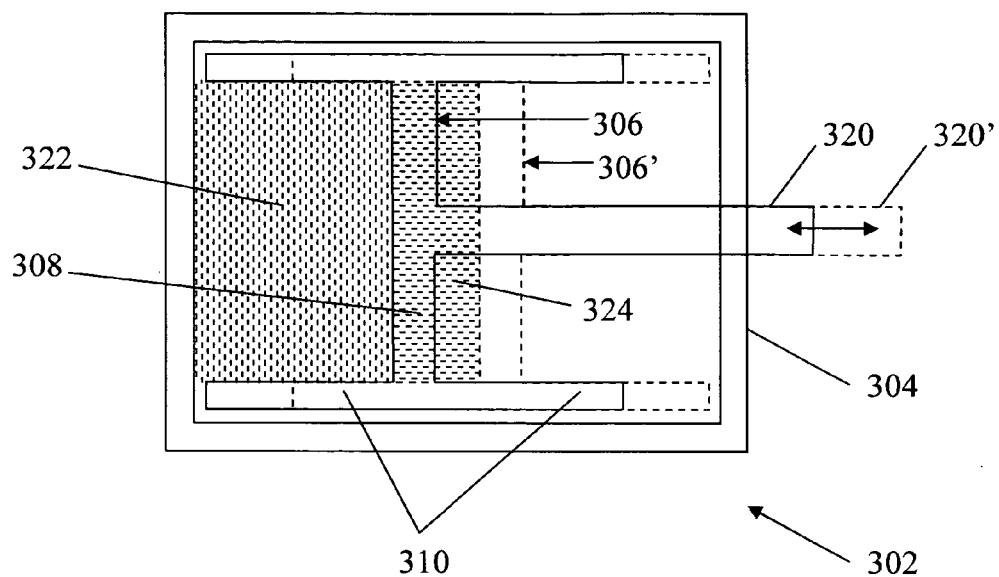

Referring now to FIG. 4b, a cross section through section A—A of FIG. 4a is shown. As shown, the piston 306 has a preferably "H" cross section (where the center portion 308 corresponds to the center portion of the "H"), or at least a "T" cross section. The drawing shows the piston 306 in two positions: the first position (shown as piston 306 with a solid line) is at the leftmost position in the pressure vessel 304 (i.e., at the leftmost position in the reciprocation length), while the second position (shown as piston 306' with a dotted line) is at the rightmost position in the pressure vessel 304 (i.e., the rightmost position in the reciprocation length). Dead volume 322 (shown with vertical cross hatches) is the minimum volume of each of the left and right volumes. Working volume 324 (shown with horizontal cross hatches) is the maximum volume of each of the left and right volumes, less the dead volume 322. Working volume 324 represents the volume over which expanding high-pressure pressurant does work on the piston 306, while the dead volume 322 does little or no additional work to the piston 306. Again, in the case of an expander or staged combustion or similar cycle, dead volume 322 may or may not be detrimental to operation of the pump, so the dead volume 322 may be a large fraction of the working volume 324 (such as at least ¼, at least ½, at least 75%, at least 100%, at least 150%, at least 200%, at least 400%, and so forth).

Figure 4C:
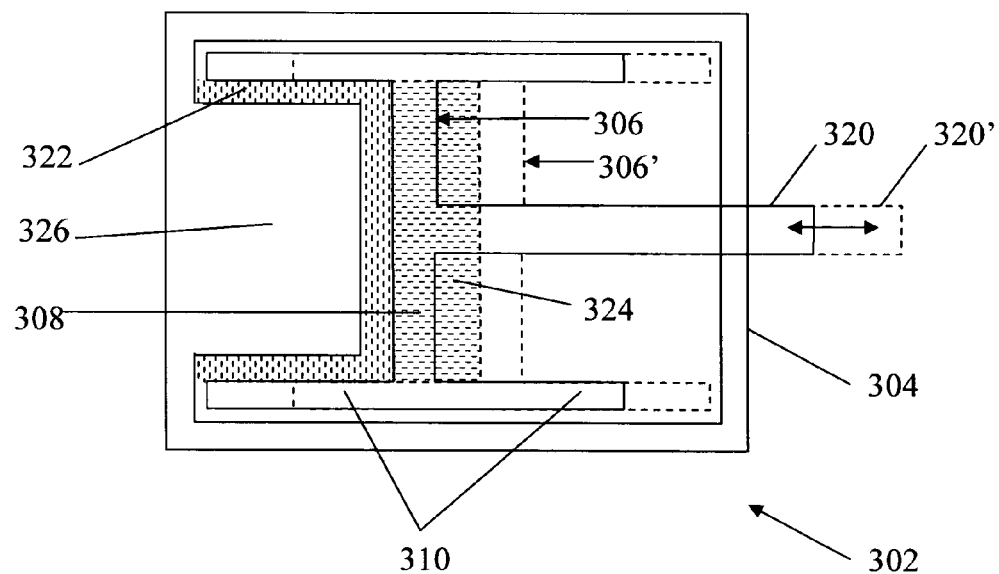
FIG. 4c is similar to the view shown in FIG. 4b, with the addition of a protrusion 326.

However, for a gas generator cycle (or any simple system in which the pressurant is exhausted from the engine portion 302 without further use or combustion), the dead volume 322 should be minimized to reduce the total pressurant carried onboard the rocket, because pressurant in the dead volume 322 is ultimately a loss. Thus, referring now to FIG. 4c, a variation on the engine portion 302 includes at least one protrusion 326 extending from an end of the pressure vessel 304, past ends of the extensions 310, and toward the center portion 308 of the piston 306, so as to displace a large portion of the dead volume 322. The engine portion 302 may be configured (such as by utilizing protrusion 326 and/or adjusting sizes of extensions 310 and/or holes 312, 314, 316, 318) to reduce the dead volume 322 to a small fraction of the working volume 324 (such as not more than ½, not more than ¼, not more than ⅛, not more than ¹⁄₁₆, not more than ¹⁄₃₂).

Figure 5:
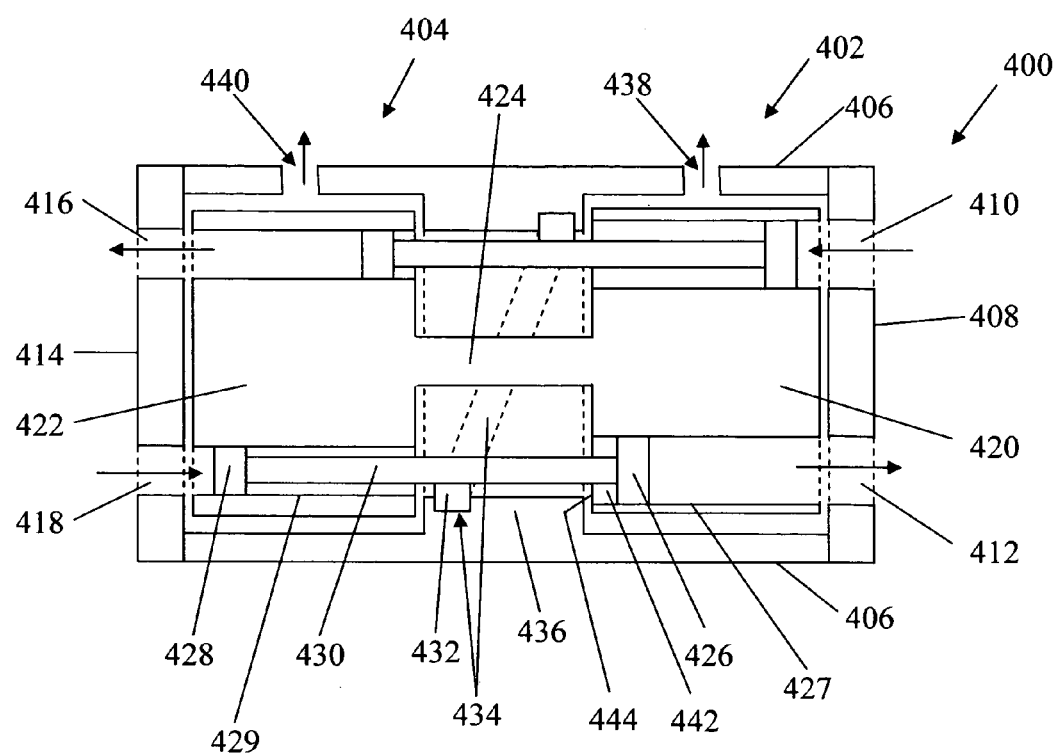
FIG. 5 is a cross sectional view of a piston pump according to another embodiment of the present invention.

Referring now to FIG. 5, a pump 400 (Rotating Spindle Pump™) comprises an engine portion 402, a pump potion 404, a shroud 406, a pressurant chamber separator 408, a pressurant entrance hole 410, a pressurant exit hole 412, a fluid chamber separator 414, a fluid exit valve 416, and a fluid entrance valve 418. The pump 400 further comprises a spindle rotatable within the shroud 406 between and with respect to chamber separators 408, 414, the spindle comprising a engine spindle 420 and a pump spindle 422 connected to each other via a shaft 424. The engine spindle 420 comprises a plurality of pressurant chambers 427 configured to contain the pressurant at high pressure, each chamber 427 containing a pressurant piston 426 preferably linearly moveable therein. The pump spindle 422 comprises a plurality of fluid chambers 429 configured to contain the fluid at high pressure, each fluid chamber 429 corresponding to a pressurant chamber 427 and containing a fluid piston 428 preferably linearly moveable therein. Each fluid piston 428 is connected to a corresponding pressurant piston 426 via a connecting rod 430, and preferably has a cross sectional or working area less than that of the corresponding pressurant piston 426. Each piston 426, 428 may be sealed within its respective chamber 427, 429 (such as with a gasket, o-ring, or other known leakage prevention device) to prevent leakage of pressurant and/or fluid past the piston 426, 428. (However, this may not be necessary where the shroud 406 is pressurized, as discussed later.) Each spindle 420, 422 and the corresponding shroud 406 and chamber separators 408, 414 are preferably cylindrical, and the connected spindles 420, 422 are configured to rotate together inside the shroud 406 about an axis substantially parallel to the length of shaft 424.

The shroud 406 comprises an annular projection 436 containing a track 434 that is configured to accommodate a wheel 432 (which need not be a wheel—i.e., it could be any low-friction track-following device, such as a smooth protrusion) connected to a connecting rod 430 between two pistons 426, 428. As shown, the track 434 varies in position along a circumference of the projection 436, so that the track 434 is nearest the fluid chamber separator 414 at one side (e.g., at arbitrarily chosen 0°) of the shroud 406 and nearest the pressurant chamber separator 408 at the other side (e.g., 180°) of the shroud 406. Alternatively, if the pump utilizes more than one cycle per spindle revolution (such as two), the track 434 is nearest the fluid chamber separator 414 at, e.g., 0° and 180° and nearest the pressurant chamber separator 408 at 90° and 270°, etc. The track 434, if viewed circumferentially, may have a sinusoidal shape along projection 436, or any other shape.

The shroud 406 may also comprise pressurant vent 438 and fluid vent 440 (or may combine the two into one vent), configured to vent respective leaked pressurant and leaked fluid. The leaked fluid may be plumbed back to the main source of fluid (e.g., a propellant tank), while the leaked pressurant may be exhausted, plumbed to the propellant tank to provide pressure, expelled through a nozzle to generate additional thrust, etc.

Further, each pressurant chamber 427 includes a cavity 442 located between a surface of pressurant piston 426 facing connecting rod 430 and a wall 444. The cavity 442 may include a spring (any spring device, whether mechanical, pneumatic, hydraulic, etc., not shown) that is configured to store compression energy. Alternatively or in addition, cavity 442 may contain a high-pressure gas capable of storing compression energy. In the latter case, wall 444 should be sufficiently leakage tight to prevent gas from leaking at a substantial rate from cavity 442. Alternatively or in addition, the wall 444 may allow leakage or not be present at all, such that a high pressure within the shroud 406 (discussed later) provides a force on pressurant piston 426.

The Rotating Spindle Pump™ is thoroughly described in U.S. Pat. No. 6,499,288, the disclosure of which has been incorporated by reference.

In operation, a source of low-pressure fluid is plumbed into the fluid entrance hole 418, and a source of high-pressure pressurant is plumbed to the pressurant entrance hole 410. The pressurant flows through the pressurant entrance hole 410 into a pressurant chamber 427, where the pressurant exerts a force on the pressurant piston 426 (and also on the fluid piston 428 via connecting rod 430). This upper region of FIG. 5 (where the chambers 427, 429 are located substantially between the fluid exit hole 416 and the pressurant entrance hole 410) will be denoted the "draining region," because fluid drains through the fluid exit hole 416.

The fluid pressure at the fluid exit hole 416 is sufficiently small (and/or the area of fluid piston 428 is sufficiently smaller than that of the pressurant piston 426) that the net force on the pressurant piston 426 due to the pressure and/or piston area differentials causes the pistons 426, 428 to move to the left, as shown by the arrow. As the pistons 426, 428 move to the left, the wheel 432 connected to and rotatable on the connecting rod 430 connecting the pistons 426, 428 is forced to move on and follow the track 434. Thus, because the track 434 changes its lateral position (where "lateral" here means in the direction parallel to the length of shaft 424, or perpendicular to faces of the chamber separators 408, 414, etc.) only as a function of rotation (e.g., where track 434 has a sinusoidal or "roller coaster" path as seen circumferentially), pistons 426, 428 can only move to the left if the spindles 420, 422 rotate as the wheel 432 connected to the connecting rod 430 follows track 434. In other words, track 434 provides a force on the spindles 420, 422 via wheel 432, connecting rod 430, and pistons 426, 428 that transforms some of energy of the pistons' leftward movement to rotational motion.

It should be understood that rotation of the spindles 420, 422 inside the shroud 406 is essentially a zero-energy transaction, where the only energy absorption is the very little friction dissipation at moving contact surfaces (such as movement of pistons 426, 428 inside their respective chambers 427, 429). Thus, energy will be taken from the pressurant to rotate the spindles 420, 422 only during the initial pump start-up; thereafter, energy absorption will be minimal. Thus, tracks 434, wheels 432, and connecting rods 430 need only be sufficiently sturdy (and massive) to withstand the forces needed to rotationally accelerate the spindles 420, 422 to their operating speed. Because the track 434 determines the number of cycles per revolution (where one cycle is the complete filling and draining of a fluid chamber 429), the pump self-regulates the rotational speed of the spindles 420, 422.

Continuing now the explanation of operation, acceleration of the pistons 426, 428 to the left causes the spindles 420, 422 to rotate, due to interaction of the connecting rod's wheels 432 with the track 434. Assume now that the spindles 420, 422 have been accelerated to the desired operational rotation speed. As pistons 426, 428 move leftward, fluid inside the fluid chamber 427 is pushed out of the fluid exit hole 416 at a high pressure. As spindles 420, 422 continue to rotate, the chambers 427, 429 that were located in the draining region soon are located between the fluid entrance hole 418 and the pressurant exit hole 412. This lower region of FIG. 5 will be denoted the "filling region," because fluid fills through the fluid entrance hole 418.

At this point, the present description will be divided into two embodiments: A) a "spent pressurant" embodiment in which the pressurant exhausted from pressurant exit hole 412 is not substantially used for any further purpose (e.g., to generate thrust); and B) an "unspent pressurant" embodiment in which the pressurant exhausted from pressurant exit hole 412 is further used, such as burned in a rocket engine and exhausted through a nozzle to generate thrust. In embodiment A, the spent pressurant typically exhausts to ambient conditions, which is atmospheric pressure for a booster class engine, and vacuum pressure for a space class thruster. In embodiment B, the expanded pressurant typically exhausts to a high-pressure (albeit lower pressure than the original high-pressure pressurant) device, such as the injector of a rocket engine.

In embodiment A, the pistons 426, 428 must remain in the filling region for enough time to allow the pressurant in the pressurant chamber 427 to exhaust to ambient conditions, and also enough time for the low-pressure fluid (which is still at a pressure higher than ambient conditions) to push the fluid piston 428 to the right (as in FIG. 5) until the fluid chamber 429 is completely filled with fluid. The spindles 420, 422 continue to rotate until the chambers 427, 429 exit the filling region and enter the draining region, where the process repeats. The total flow area of each of the holes 410, 412, 416, 418 may depend on various factors, such as the desired rotational speed, the density of the fluid, the masses of the pistons 426, 428, the pressure drop across the pressurant entrance hole 410 and the fluid exit hole 416, the pressure drop across the fluid entrance hole 418 and the pressurant exit hole 412, etc.

Because spindles 420, 422 are designed to freely rotate inside shroud 406 with respect to chamber separators 408, 414, there is preferably no "seal" (i.e., a physical gasket, o-ring, or the like) to prevent leakage of gases between holes 410, 412, 416, 418. The faces of the engine spindle 420 and the facing pressurant chamber separator 408 (as well as faces of the pump spindle 422 and the facing fluid chamber separator 414) should be very smooth, and separated by a sufficiently small separation gap so that leakage via the gap is minimal and predictable. The leaked pressurant and fluid act as a fluid bearing that minimizes contact friction between the spindles 420, 422 and the chambers separators 408, 414.

The rate of leakage of pressurant and fluid depend on the pressure differentials across the separation gaps. To minimize this pressure differential, the shroud 406 is preferably of sufficient strength and configured to withstand a very high pressure. For example, to provide some numbers, assume that the high-pressure pressurant is fed into the pressurant entrance hole 410 at 1000 psi, the fluid is pressurized at the fluid exit hole 416 to 950 psi (where the pressure differential is sufficient to accelerate the pistons 426, 428, connecting rod 430, and fluid inside fluid chamber 429 to fully drain the fluid chamber 429 of fluid in the time available in the draining region). If so, leakage of pressurant from the pressurant entrance hole 410 should be allowed to pressure the shroud 406 to near (but less than) the fluid pressure of 950 psi, such as to 940 psi. Because the pressure is lower than both 950 and 1000 psi, a leakage of fluid and pressurant will still be induced, but the leakage rate will be far reduced, because the pressure differential between 940 psi and 950 psi of the fluid is much less than 0 psi and 950 psi, and the pressure differential between 940 psi and 1000 psi of the pressurant is much less than 0 psi and 1000 psi. If the pressure within the shroud 406 is allowed to exceed the fluid's pressure at fluid exit hole 416, a direct flow of pressurant to the fluid exit hole 416 may be induced, which may cause problematic "burping" in the rocket engine system. These numbers may be modified where the pump uses pistons 426, 428 of differing areas, as shown, because the pressurant at the pressurant entrance hole 410 may have a pressure lower than the fluid at the fluid exit hole 416, in which case the shroud 406 is preferably maintained at a pressure lower than the pressurant to avoid a flow of fluid to the pressurant entrance hole 410.

Pressurant vent 438 and fluid vent 440 may each include a valve (not shown) to adjust a flow rate pressurant and fluid through the respective vents, to thereby adjust and regulate the pressure inside the shroud 406. Fluid from fluid vent 440 may be plumbed directly to the source of the fluid (such as the propellant tank), so that leaked fluid is easily recycled, and pressurant from pressurant vent 438 may be plumbed to help pressurize a propellant tank, or may be exhausted or used for other purposes. Alternatively, both vents 438, 440 may be combined into a single vent, where the vented mixture is plumbed back to the propellant tank and the propellant tank regulated to a predetermined pressure to bleed off excessive leaked pressurant. The shroud 406 could be pressurized with a gas different from or in addition to the pressurant, such as a source of high pressure helium or nitrogen or other relatively inert gas (inert relative to the pressurant and/or fluid).

In embodiment B, because the expanded pressurant must be exhausted at a relatively high pressure through pressurant exit hole 412, the fluid entering through fluid entrance hole 418 typically has an insufficient pressure to push the pistons 426, 428 to the right when the chambers 427, 429 are in the filling region. Therefore, where the cavity 442 contains a spring or a high-pressure gas, the force due to the spring or gas will help push the pressurant piston 426 to the right while the chambers 427, 429 are in the filling region, as long as the total force pushing the piston 426 to the right exceeds the leftward force due to the high-pressure gas at the pressurant exit hole 412. Further, in order to maintain a high gas pressure inside cavity 442 in spite of leakage therefrom, the pressurant piston 426 may include a check valve (not shown) that allows pressurant to flow into (but preferably not out from) the cavity 442.

Alternatively or in addition, the cavity 442 may be fluidly connected to the inside of shroud 406 (or wall 444 may not exist at all), so that the high pressure in the shroud 406 (due to leaked pressurant or other pressurized gas, as explained previously) exerts a net force on pistons 426, 428 in the rightward direction, due to the differential areas of the pistons 426, 428. Thus, when the pistons 426, 428 are in the filling region, the gas inside the shroud 406 is of sufficiently high pressure to push the pistons 426, 428 rightward in spite of the opposing force due to the pressure of the gas at the pressurant exit hole 412. Because of this rightward movement, the fluid chamber 429 fills with fluid, and rotation of the spindles 420, 422 moves the chambers 427, 429 out of the filling region into the draining region, where the process begins again. Of course, in the case of embodiment B (where energy is stored by a spring or pressurized gas which may be located inside the shroud 406), the pressurant from the pressurant entrance hole 410 must work harder than that of embodiment A in order to push the pressurant piston 426 against the spring or gas, and thus must have a higher pressure. However, the advantage of not needing to waste the expanded pressurant from the pressurant exit hole 412 (in embodiment B) may be worth the cost of running the system at a higher pressure.

When used in embodiment B, the pump 400 of FIG. 5 is a self-rotating, self-regulating, low-friction pump with effectively zero leakage, because leaked propellant/fluid is recycled and leaked pressurant may be expanded through a nozzle to generate thrust.

In another embodiment, the track 434 need not be continuous (e.g., sinusoidal) throughout the entire 360° of the shroud's circumference. After all, the track 434 needs only convert a lateral force in one direction (i.e., in the "draining" direction) into rotational energy, so the track 434 may have a truncated parabolic or simple angled shape, and the track 434 may extend only in the draining region (alternatively only in the filling region), so that only one or more connecting rod/piston combinations located in the draining (filling) region at any given time contribute to the spindles' rotational motion. The track 434 may extend for less than 360°, such as between 30° and 180°. Further, not all connecting rod/piston combinations need to have wheels 432 that are slidable along the track 434; perhaps only one or a few such connecting rods have a wheel 432.

The words "right," "left," "top," "bottom," etc. are in reference to the orientation of the shown drawings, are used for ease of description, and are not intended to limit the scope of the present invention. For example, the pump 400 in FIG. 5 may, e.g., be oriented vertically, as shown in FIG. 6, so that the fluid chamber separator 414 is on the bottom and the pressurant chamber separator 408 is on the top.

Figure 6:
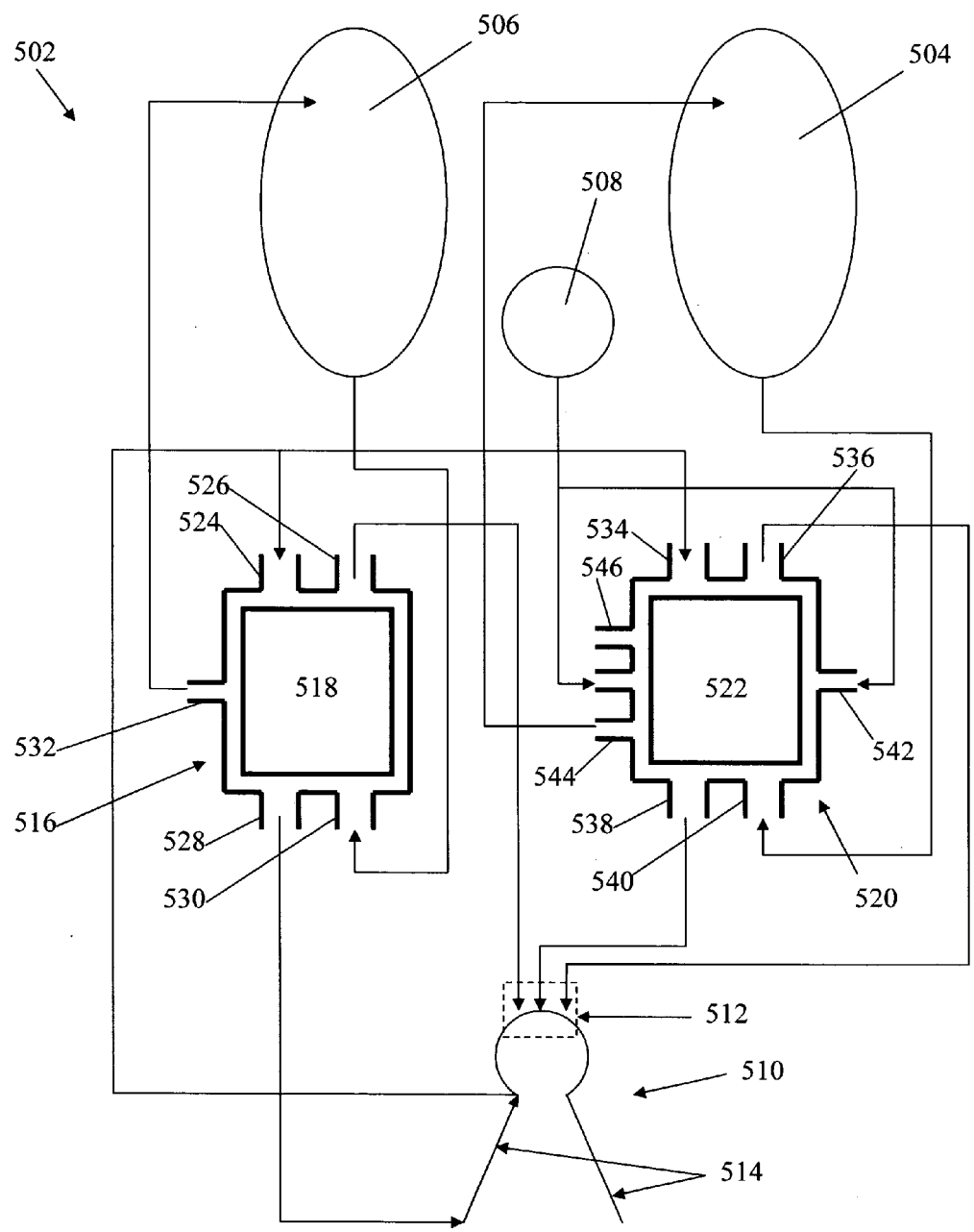
FIG. 6 is a schematic view of a rocket engine system utilizing an expander cycle and pumps according to an embodiment of the present invention.

Referring now to FIG. 6, a rocket engine system 502 utilizing an expander cycle comprises an oxidizer tank 504 containing any known preferably liquid oxidizer and a fuel tank 506 containing any known preferably liquid fuel (although they could be reversed), an inert gas tank 508 storing a regulated supply of preferably high-pressure helium or nitrogen, a rocket engine 510 comprising an injector 512 and a regeneratively cooling nozzle 514, a pump 516 (preferably a Rotating Spindle Pump™ comprising a rotatable spindle 518) configured to pump the propellant (preferably the fuel) from propellant tank 506, and a pump 520 (preferably a Rotating Spindle Pump™ comprising a rotatable spindle 522) configured to pump the propellant (preferably the oxidizer) from propellant tank 504. The fuel pump 516 comprises a pressurant entrance 524, a pressurant exit 526, a propellant (or fluid) exit 528, a propellant (or fluid) entrance 530, and a leakage vent 532 (optional). The oxidizer pump 520 comprises a pressurant entrance 534, a pressurant exit 536, a propellant (or fluid) exit 538, a propellant (or fluid) entrance 540, an inert gas inlet 542, a pressurant vent 546, and a propellant (or fluid) vent 544.

Figure 7:
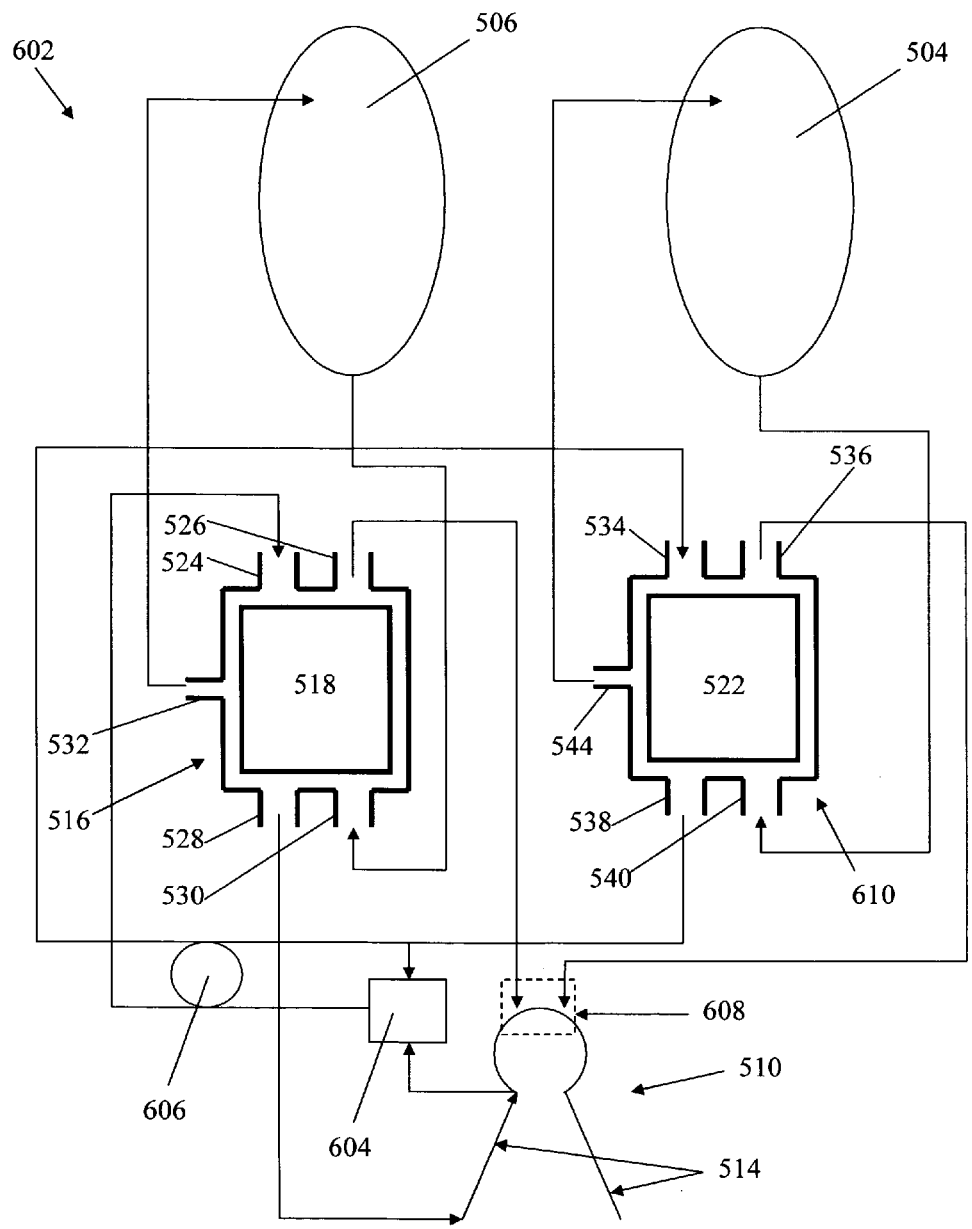
FIG. 7 is a schematic view of a rocket engine system utilizing a staged combustion cycle and pumps according to an embodiment of the present invention.
Figure 8:
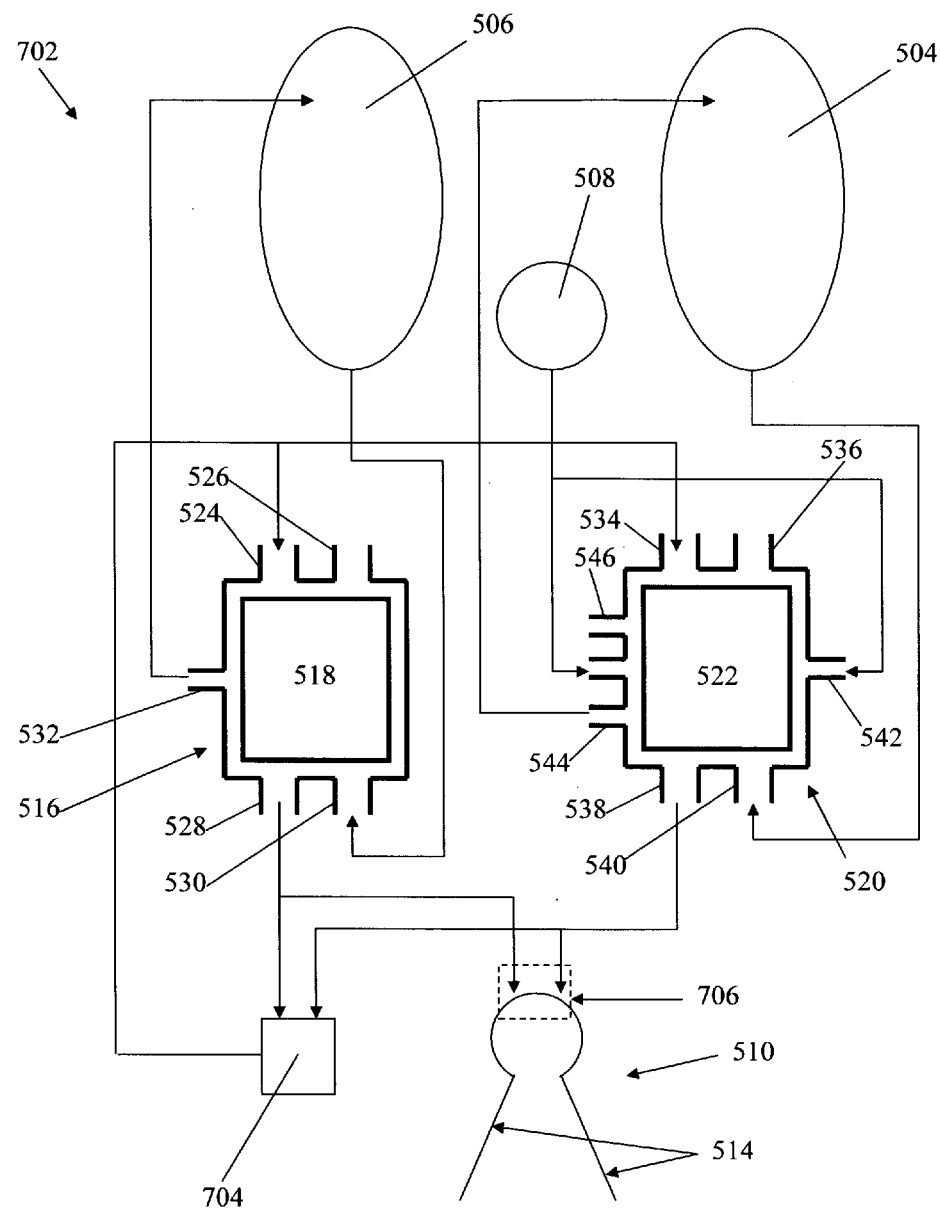
FIG. 8 is a schematic view of a rocket engine system utilizing a gas generator cycle and pumps according to an embodiment of the present invention.

FIGS. 6–8 demonstrate application of the Rotating Spindle Pump™ to various rocket engine systems, but of course any of the pumps, pump portions, and/or engine portions previously described may be used in their place. The various elements are fluidly connected as shown in the drawing, with flow directions indicated by arrows.

Operation of the rocket engine system 502 will be briefly described. Ignition and achievement of steady-state operation will be assumed, as details of the ignition process are not necessary for comprehension of the design. Fuel is delivered from fuel tank 506 to the fuel pump 516 via propellant entrance 530, and is pumped from the propellant exit 528 of the fuel pump 516 to the regeneratively cooling nozzle 514. In the nozzle 514, the liquid fuel absorbs combustion heat from combustion in the rocket engine 510 and vaporizes at high pressure. The hot, high-pressure fuel vapor is plumbed to the pressurant entrances 524, 534 of both pumps 516, 520, where the fuel vapor acts as the pressurant and expands to provide the pumping, as explained with reference to FIGS. 1–5. Because the pressure of the hot, high-pressure fuel vapor injected into the pressurant entrance 524 is necessarily lower than the pressure of the liquid fuel pumped from the propellant exit 528 (otherwise flow would not be induced in the desired direction through nozzle 514), at least fuel pump 516 (and possibly also oxidizer pump 520) utilizes differential pistons (e.g., pistons 426, 428 connected by connecting rod 430, as shown in FIG. 5) to allow the lower pressure vapor to provide a net positive force on the higher pressure liquid.

The expanded fuel vapor is then plumbed from the pressurant exits 526, 536 to the injector 512 of the rocket engine 510, where it is injected into the engine's combustion chamber and burns with the oxidizer. The fuel pump 516 may have a fuel vent 532 to allow leaked fuel and/or pressurant (fuel vapor) to be plumbed back to the fuel tank 506. If so, the liquid fuel may be fed to the fuel tank 506 while the fuel vapor may serve to self-pressurize the fuel tank 506 (and exhausted via a pressure regulator (not shown) if excessive in quantity). However, if the leakage of pressurant (fuel vapor) has a sufficiently slow rate, then the fuel vent 532 may be omitted altogether, as leaked fuel vapor then interacts with the liquid fuel in the vicinity of the propellant exit 528 and condenses into liquid fuel.

The oxidizer from the oxidizer tank 504 is delivered to the oxidizer pump 520 via the propellant entrance 540, and is pumped from the propellant exit 538 directly to the propellant injector 512 of the rocket engine 510, where it is injected into the engine's combustion chamber and burns with the fuel. Because the hot, high-pressure fuel vapor is chemically incompatible with the oxidizer, the inert gas inlet 542 may serve as a fluid isolator if the inert gas is plumbed to the inert gas inlet 542 at a pressure sufficiently high to ensure that the inert gas flows both upward (toward and through the pressurant vent 546) and downward (toward and through the propellant vent 544). The oxidizer pump 520 may have one, two, or several inert gas inlets, depending on what is needed to prevent contact and reaction between the incompatible propellants. Such methods of isolating two incompatible chemicals by continuously flowing an inert intermediary between the two chemicals is well known in the art and will not be further discussed. As shown, liquid oxidizer is plumbed back to the oxidizer tank 504 via propellant vent 544, perhaps along with some inert gas from the inert gas inlet 542, which may be used to help pressurize the oxidizer tank 504 and which may be released via a pressure regulator (not shown) if excessive in quantity. The pressurant vent 546 may freely exhaust the leaked fuel vapor, or it may expand the vapor through a nozzle to generate thrust (configuration not shown), or it may plumb the fuel vapor into the rocket engine's injector 512 (configuration not shown), etc.

For simplicity of explanation, FIG. 6 does not show control valves, on-off valves, flow and pressure regulators, accumulators, etc., etc., which absence is not intended to limit the scope of the present invention.

Referring now to FIG. 7, reference numbers identified in FIG. 6 are used to denote the same or substantially similar elements. Thus, the rocket engine system 602 shown in FIG. 7 utilizes a staged combustion cycle and further comprises a gas generator 604, a heat exchanger 606, a modified injector 608, and a modified oxidizer pump 610. In operation, some or all of the hot, high-pressure fuel vapor plumbed from the regeneratively cooling nozzle 514 is fed to the gas generator (also known as a combustor) 604, where it burns typically very fuel rich with oxidizer. As a result, far more high-pressure pressurant is generated than with the corresponding expander cycle. The fuel-rich combustion products are fed directly to the fuel pump's pressurant entrance 524 to power the fuel pump 516, with the expanded fuel vapor being fed from the pressurant exit 526 to the injector 608. Alternatively, at least a portion of the liquid fuel is fed directly from the propellant exit 528 to the injector 608.

Further, instead of plumbing all liquid oxidizer directly to the injector 608, some or all of the liquid oxidizer is plumbed from the oxidizer pump's propellant exit 538 to a heat exchanger 606, with at least some of the oxidizer being plumbed into the gas generator 604 to react with the fuel. In the heat exchanger 606, some of the heat from the hot, high-pressure combustion products of the gas generator 604 is transferred (e.g., via heat-conducting walls) to the liquid oxidizer to heat and vaporize it to a hot, high-pressure oxidizer vapor. This oxidizer vapor is plumbed to the oxidizer pump 610 via pressurant entrance 534 to power the pump 610, and the partially expanded oxidizer vapor is then plumbed from the pressurant exit 536 to the injector 608. Because fuel vapor is used to power the fuel pump 516 and oxidizer vapor is used to power the oxidizer pump 610, there is no worry of impermissible mixing of incompatible propellants, so the modified oxidizer pump 610 has only an optional propellant vent 544, with no inert gas inlet as in FIG. 6.

Of course, the fuel need not necessarily be fed to a regeneratively cooling nozzle 514 at all, where other means of cooling the nozzle or controlling its consumption (in the case of an ablative nozzle) are used. In such a case, some or all of the liquid fuel may be fed directly to the gas generator (with the remainder fed to the engine's injector 608), and the hot, high-pressure fuel-rich combustion products may then be plumbed to the pressurant entrances 524, 534, etc. Alternatively or in addition, any of the systems described herein (such as in FIGS. 6–8) may utilize: a) one gas generator generating fuel-rich (or alternatively oxidizer-rich) combustion products that are fed to both pumps, where the oxidizer (or fuel) pump is protected from uncontrolled or undesired reaction; b) one gas generator generating fuel-rich (or alternatively oxidizer-rich) combustion products that are fed to the fuel (or oxidizer) pump, and a heat exchanger to generate hot, high-pressure oxidizer (or fuel) vapor to feed to the oxidizer (or fuel) pump; or c) two gas generators, one generating fuel-rich combustion products and the other generating oxidizer-rich combustion products, etc. In other words, variations on any of the described cycles are possible and within the scope of the present invention. Further, in FIGS. 6 and 7, which are applicable to expander and/or staged combustion cycles, the pumps 516, 520 should be able to accommodate such cycles, as discussed previously with respect to FIGS. 1–5.

Referring now to FIG. 8, again reference numbers identified in FIG. 6 or 7 are used to denote the same or substantially similar elements. Thus, the rocket engine system 702 shown in FIG. 8 utilizes a gas generator cycle and further comprises a gas generator 704 and a modified injector 706. In operation, at least some liquid fuel pumped from the propellant exit 528 of the fuel pump 516 is fed into the gas generator 704, with the remaining quantity fed to the injector 706. Further, at least some liquid oxidizer pumped from the propellant exit 538 of the oxidizer pump 520 is fed into the gas generator 704, with the remaining quantity fed to the injector 706. The gas generator 704 combusts the fuel and oxidizer to generate hot, high-pressure product gases that are fed into the pressurant entrances 524, 534 to power the respective pumps 516, 520. If pressurant exits 526, 538 are exhausts that exhaust the pressurant without further use (as in a typical gas generator cycle), then pumps 516, 520 need not have the added complexity of being capable of expander or staged combustion cycles. Of course, the embodiment shown in FIG. 8 may utilize a heat exchanger and/or additional gas generator, as discussed above, to relieve the necessity of an inert gas to serve as a chemical isolator. Further, the oxidizer tank 504 in any of the discussed embodiments may be replaced with an air inlet (or an air inlet may be added in addition to an oxidizer tank 504), such that air is fed to the oxidizer pump and pumped to a high pressure to the injector 706 via the propellant exit 538. The resulting system is an air-breathing system in which the oxidizer pump 520 provides high-pressure air to the engine 510, where it combusts with the fuel.

Figure 9A:
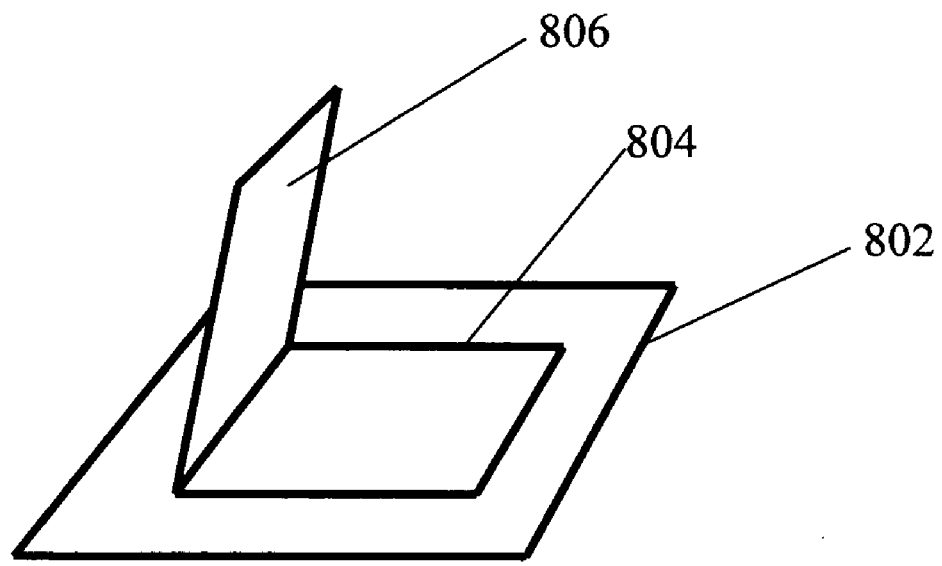
FIG. 9a shows a perspective view of a check valve having a single flow hole.
Figure 9B:
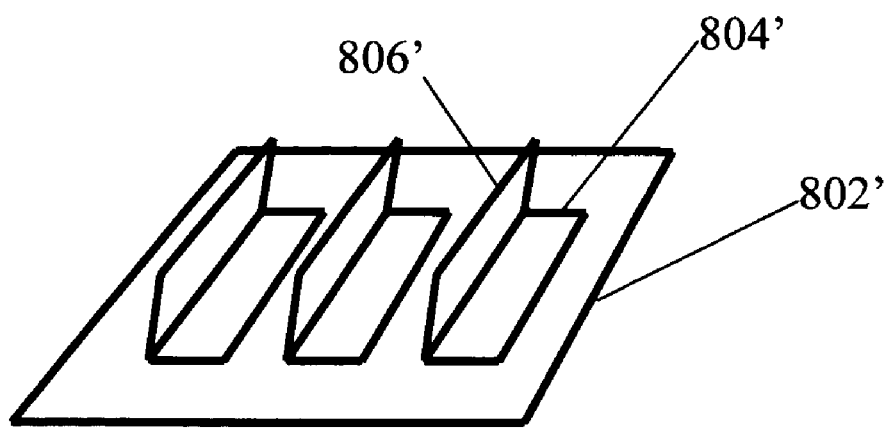
FIG. 9b shows a perspective view of a check valve having a plurality of flow holes.
Figure 10A:
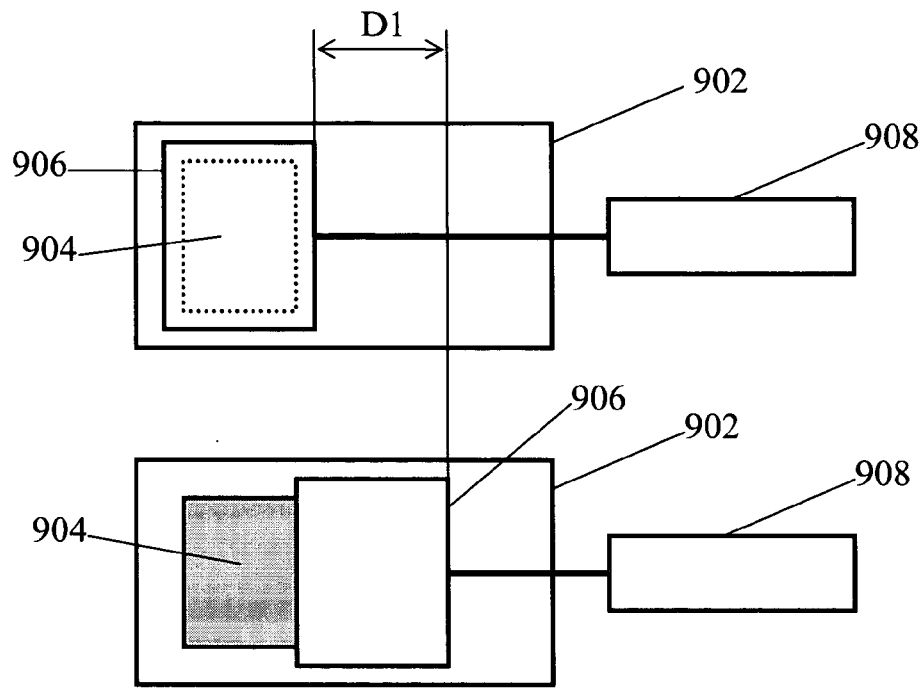
FIG. 10a shows a top view of a plate valve having a single flow hole.

FIGS. 9a, 9b, 10a, and 10b show a check valve, an improved check valve, a plate valve, and an improve plate valve, respectively. FIG. 10a shows the closed and open configuration of a typical plate valve 902 having a flow hole 904, a valve plate 906, and a solenoid 908 connected by a linkage to the plate 906. The solenoid 908 is an electrical device that, depending on the current fed to it, will push or pull the valve plate 906 to close or open the valve 902, respectively. When the valve 902 is open (as shown in the bottom of FIG. 10a), fluid may flow through the flow hole 904. When the valve 902 is closed (as shown in the top of FIG. 10a), fluid flow through the flow hole 904 is restricted or entirely prevented. In a preferred embodiment, the direction of flow is in a direction perpendicular to the page, into the page. Thus, when the valve 902 is closed (i.e., the valve plate 906 is completely covering the flow hole 904), a pressure differential across the valve plate 906 pushes the valve plate 906 tightly against the valve 902, thus reducing or entirely preventing any flow or leakage of the fluid through the flow hole 904. To fully open the valve 902, the valve plate 906 must move a distance D1, as shown in FIG. 10a. Because the valve plate 906 has mass, this motion requires energy. The faster the motion (i.e., the quicker the valve 902 can open and close), the more energy required to accelerate the mass. Further, because of the contact between the valve plate 906 and the surface of the valve 902, there is frictional energy dissipation when the valve 902 is opened and closed. This dissipation increases as the distance D1.

Figure 10B:
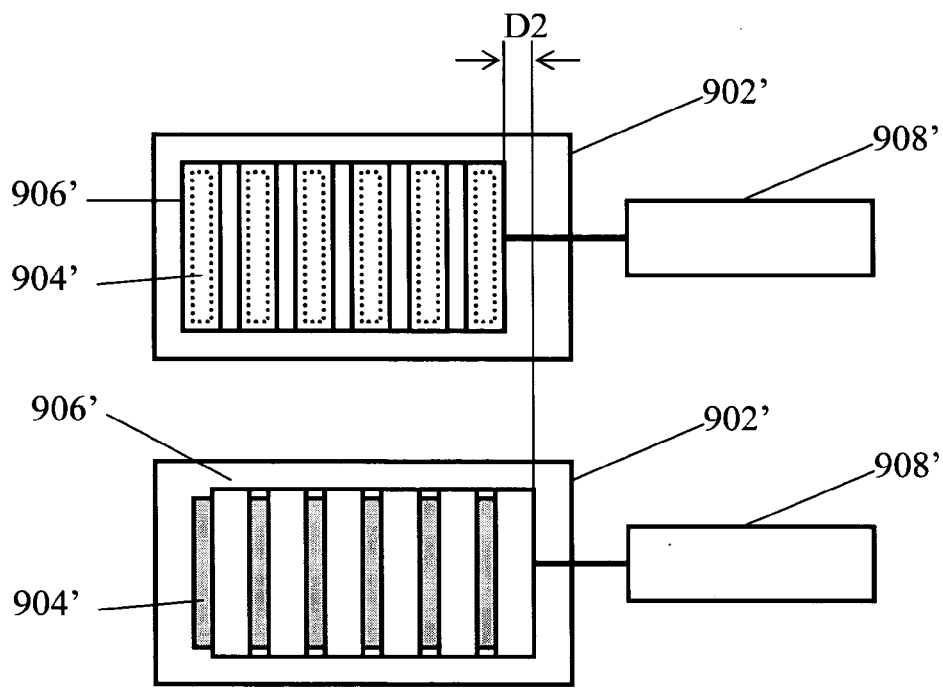
FIG. 10b shows a top view of a plate valve having a plurality of flow holes.

FIG. 10b shows a plate valve 902' according to a preferred embodiment. Plate valve 902' includes a plurality of flow holes 904', a valve plate 906', and a solenoid 908' connected to the valve plate 906'. Valve plate 906' has a series of slots, corresponding to the width of each of the flow holes 904'.

Valve 902' in FIG. 10b is very similar to the valve 902 in FIG. 10a (e.g., the total flow area of all flow holes 904' in FIG. 10b is equal to the flow area of flow hole 904 in FIG. 10a). A substantial difference, however, is that the valve plate 906' need move only a distance D2 (as shown in FIG. 10b) in order to provide the same flow hole area provided by the valve 902 shown in FIG. 10a. Therefore, the energy required to accelerate the mass of the valve plate 906' a distance D2, given a particular cycle time, is less than the energy required to accelerate the mass of valve plate 906 a distance D1. Further, the total frictional power dissipation is less when moving valve plate 906' a distance D2 than when moving valve plate 906 a distance D1. Thus, solenoid 908' in FIG. 10b need not be as powerful as solenoid 908 in FIG. 10a, so the total mass of valve 902' is less than valve 902. Valve 902' need not be a plate valve.

A similar benefit of using many small flow holes instead of one large flow hole is shown with respect to FIGS. 9a and 9b. FIG. 9a shows a conventional check valve 802 having a flow hole 804 and a valve plate 806. Valve plate 806 is hinged and opens and closes in a direction approximately parallel to the flow of fluid through the flow hole 804. In FIGS. 9a and 9b, the valve 802, 802' is open, thus allowing fluid to pass through in an upward direction. If the fluid began, instead, to flow downward, the hinged valve plate 806 would be accelerated downward by the fluid flow until the valve plate 806 reached the surface of the valve 802, where the valve plate 806 would stop and further downward fluid flow would be stopped. FIG. 9b shows a check valve 802' having a plurality of flow holes 804', each flow hole having a hinged valve plate 806' that acts similarly to the valve plate 806 in FIG. 9a. As in the analysis of FIGS. 10a and 10b, the distance that valve plates 806' must traverse to fully open the check valve 802' is substantially less than the distance that valve plate 806 must traverse to fully open the check valve 802. Thus, for a given application, the check valve 802' in FIG. 9b has a much faster open and close time than the check valve 802 in FIG. 9a. Use of the improved valves 902' and 802' of FIGS. 10b and 9b, respectively, may help to reduce the opening and closing time of any of the valves (e.g., pressurant entrance and exit valves 26, 32 and fluid entrance and exit valves 22, 24, respectively, in FIG. 1), and thus help to reduce total cycle time. These embodiments are offered only as examples, and any ultrafast valve equivalent is within the scope of this invention.

Figure 11:
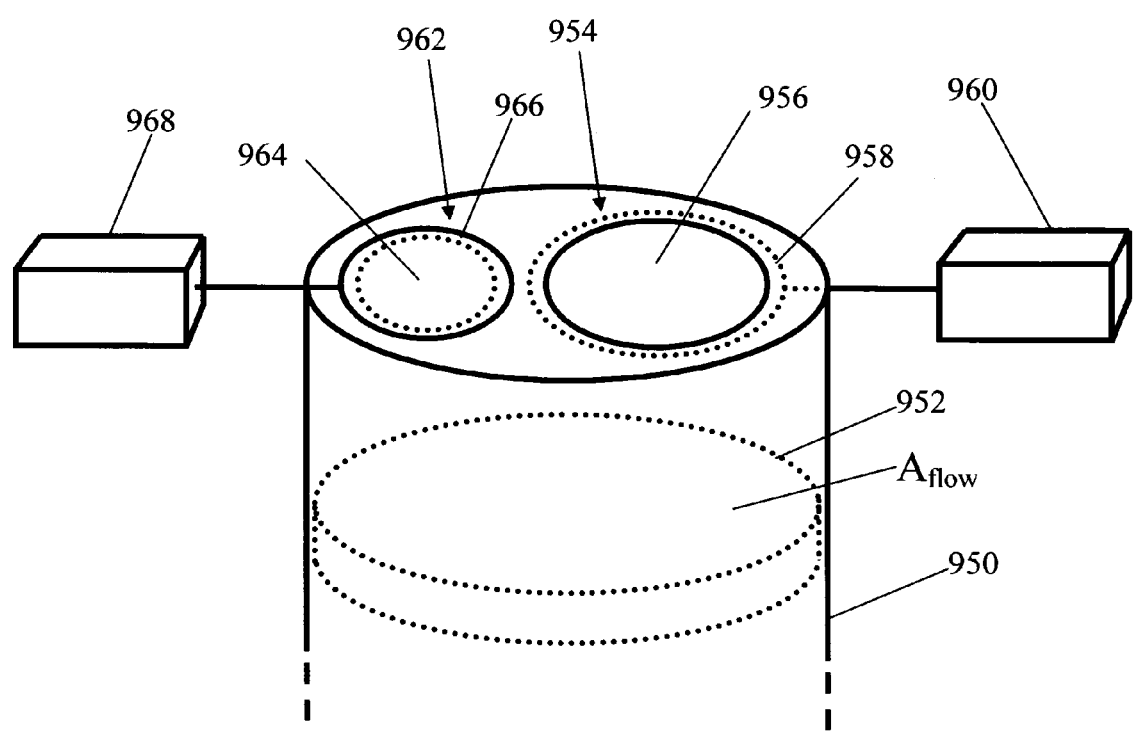
FIG. 11 shows a perspective view of an engine portion of a piston pump according to an embodiment of the present invention.

Referring now to FIG. 11, an upper portion of a first pressure vessel 204 shown in FIG. 3 is shown. The upper portion 950 of the vessel comprises a piston 952 (which could be any suitable movable partition), pressurant exit hole 956, a pressurant exit valve having a valve plate 958 and a solenoid 960, pressurant entrance hole 964, and a pressurant entrance valve having a valve plate 966 and a solenoid 968. For simplicity in the figures, pressurant exit and entrance holes 956, 964 and pressurant exit and entrance valve plates 958, 966 are shown as if there is only one pressurant exit and entrance hole 956, 964 each. However, in a preferred embodiment, there may be a plurality of pressurant exit and entrance holes 956, 964 each, as in the valve embodiment shown in FIG. 10b. In the embodiment shown in FIG. 11, pressurant exit valve plate 958 is inside pressure vessel 950 because the pressure inside the pressure vessel 950 is always at least as high (and usually much higher) than the pressure on the other side of the pressurant exit valve plate 958, so this pressure serves to press the plate 958 against its sealing surface to create a good seal. Similarly, the pressurant entrance valve plate 966 is outside of the pressure vessel 950 because the pressure inside the pressure vessel 950 is always equal to or lower (and usually much lower) than the pressure on the other side of the pressurant entrance valve plate 966, so this pressure serves to press the plate 966 against its sealing surface to create a good seal.

FIG. 11 shows that the piston 952 has a surface area that is approximately equal to the cross sectional flow area $A_{flow}$ of the pressure vessel 950. In order to depressurize the pressurant from the pressure vessel 950 very quickly before the pressure vessel 950 begins to fill with fluid or propellant, the cross sectional area of the pressurant exit hole 956 should be large in relation to $A_{flow}$. For example, the pressurant exit hole 956 may have a cross sectional flow area that is at least one-tenth (or at least 1/20, 1/7, 1/4, 1/2, etc.) the cross sectional flow area $A_{flow}$ of the pressure vessel 950. By decreasing the depressurization time in these ways (reducing the dead volume of high-pressure pressurant and by increasing the cross sectional flow area of the pressurant exit valve), the total cycle time and corresponding pressurizer mass can be reduced.

Utilizing one or more of the above embodiments may allow the cycle time of each engine portion (e.g., 38 in FIG. 1) to be driven very low, such as below 500 milliseconds, 250 ms, 100 ms, or 50 ms. However, as the cycle time is pushed lower and lower, the size and mass of the pump portion also gets lower, causing the average fill and drain velocities inside the pump portion to increase in order to maintain a constant propellant flow rate. Because additional pressurant may be required to accelerate the propellant to higher and higher average drain velocities, there may be an optimized cycle time, such that a shorter cycle time actually increases the mass of the pressurizer system, because the increase in pressurant mass necessary to drain the propellant faster may overcome the decrease in storage chamber mass due to a shorter cycle time. Thus, in a preferred embodiment, the cycle time is greater than 1 ms.

Most of the embodiments described herein have represented simple versions for clarity of explanation. As understood by one of ordinary skill in the art, many of the features of the embodiments described herein may be "mixed and matched" to the extent physically possible to satisfy individual design requirements regarding cost, complexity, size, type of propellant and pressurant, desired flow rate, thrust, and other factors. As merely an example of such allowable mixing and matching, the heat exchanger 606 shown in FIG. 7 may be utilized in the expander cycle shown in FIG. 6 so that hot, high-pressure oxidizer vapor (instead of hot, high-pressure fuel vapor) is used as the pressurant in the oxidizer pump 520, to eliminate the need for an inert gas to be injected as an isolator into inert gas inlets 542.

Figure 12:
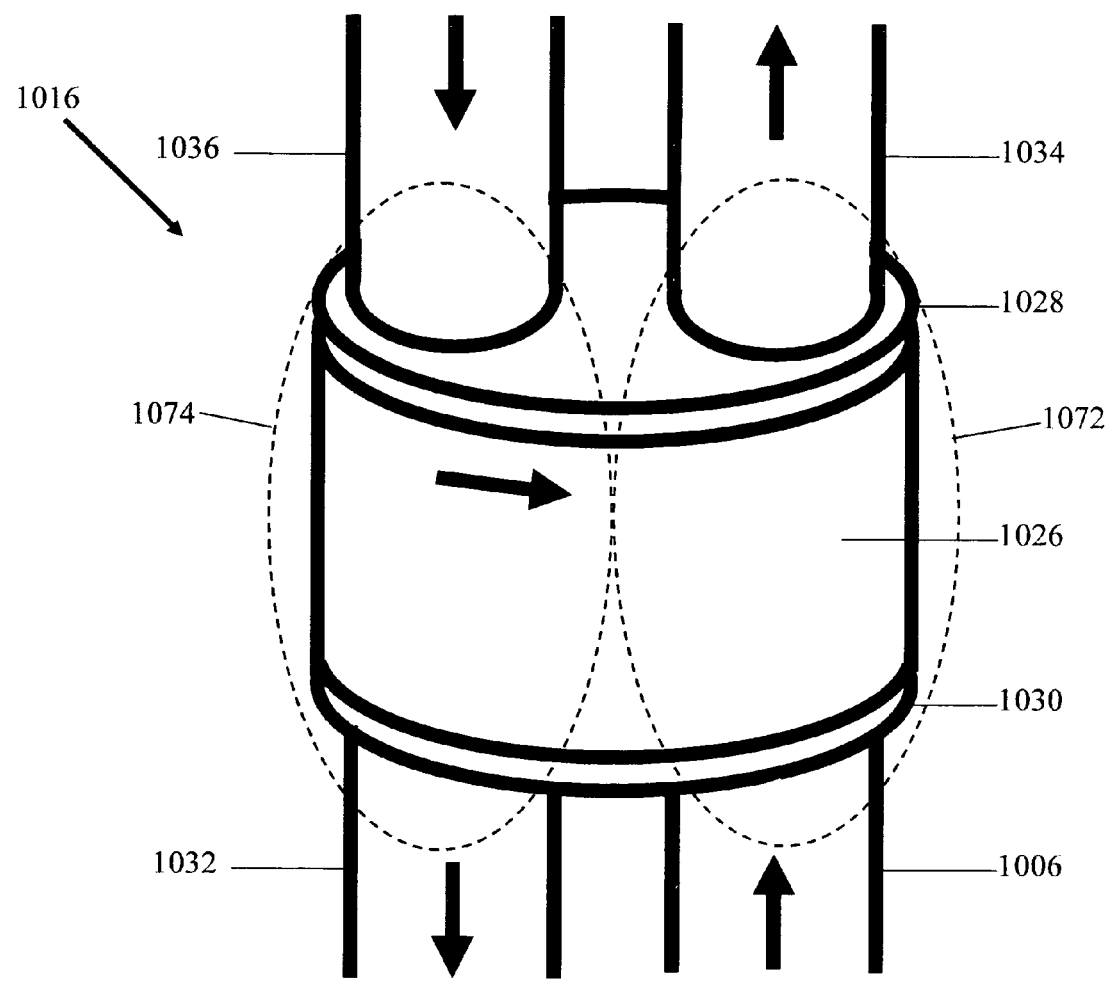
FIG. 12 is a perspective view of a pressurizer according to one embodiment.

Referring now to FIG. 12, a pressurizer 1016 according to an embodiment includes: a top chamber separator 1028 to which pressurant conduit 1036 and exhaust conduit 1034 are connected; a bottom chamber separator 1030 to which engine conduit 1032 and propellant conduit 1006 are connected; and a rotatable spindle 1026. Propellant (or liquid fluid) flows into the spindle 1026 through propellant conduit 1006 and out of the spindle 1026 through engine conduit 1034. Pressurant (e.g., high pressure gas) flows into the spindle 1026 through pressurant conduit 1036 and out of the spindle through exhaust conduit 1034. Propellant and pressurant flow in the direction indicated by the arrow shown in each conduit. The spindle 1026 in this embodiment rotates in the direction indicated by the arrow shown on the spindle 1026, although it could spin in the opposite direction. A first region 1072 is connected to the propellant conduit 1006 and exhaust conduit 1034, and a second region 1074 is connected to the engine conduit 1032 and pressurant conduit 1036, where the first region 1072 is configured to fill with the propellant and the second region 1074 is configured to drain of the propellant by force of the pressurant while the first region 1072 fills with the propellant. In one embodiment, the pressurizer may or may not have the following features: the first region 1072 may comprise a first plurality of fluidly connected transfer chambers 1042 (shown in FIG. 14); the second region 1074 may comprise a second plurality of fluidly connected transfer chambers 1042; the transfer chambers 1042 may be movable in a revolving cycle with respect to the first and second regions 1072, 1074; and the pressurizer may be configured so that the first region 1072 is not configured to drain of the propellant and the second region 1074 is not configured to fill with the propellant. The first and second regions 1072, 1074 may be approximately parallel.

Figure 13:
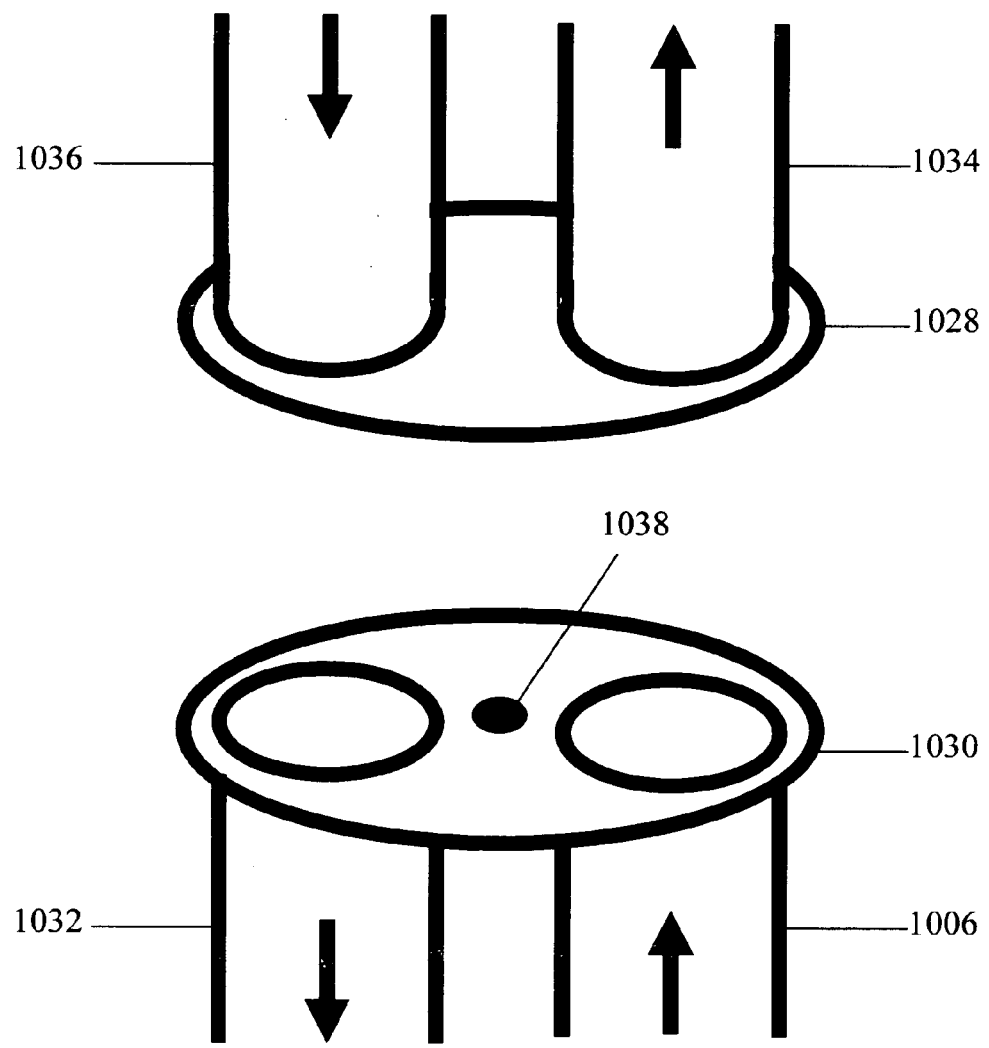
FIG. 13 is a perspective view of the pressurizer shown in FIG. 12 without the spindle.

Referring to FIG. 13, which shows the pressurizer without the spindle 1026, the pressurizer includes a rotatable connector 1038 that rotatably connects the bottom chamber separator 1030 to the spindle 1026. There could also be such a connector connecting the top chamber separator 1028 to the spindle 1026. The connector could comprise bearings, such as ball bearings or gas bearings. Further, there are seals (not shown) between the moving spindle 1026 and selected parts of the top chamber separator 1028 and the bottom chamber separator 1030. The seals should allow the spindle 1026 to spin with minimal friction while preventing propellant and pressurant from flowing into the wrong conduits at the wrong times. By way of example and not of limitation, there could be a circular seal around the circular hole on the left side of the bottom chamber separator 1030 in FIG. 13, where the engine conduit 1032 connects to the bottom chamber separator 1030. There could also be a seal on the top of the bottom chamber separator 1030 and around its circumference, with an additional seal to separate the left and right halves of the bottom chamber separator. Any placement and material composition of such seals known in the art are within the scope of the present invention.

Figure 17:
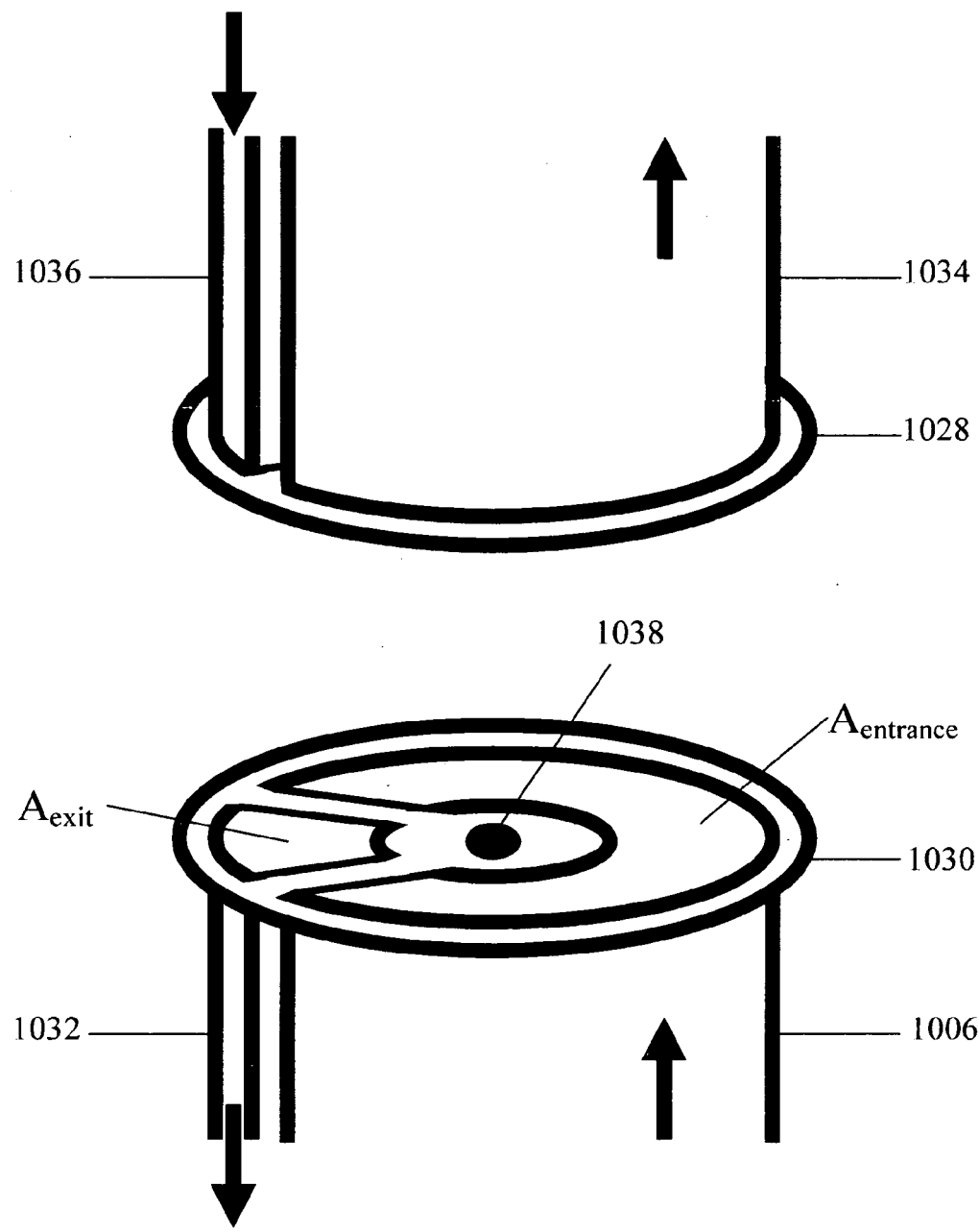
FIG. 17 shows a perspective view of a pressurizer according to one embodiment, without the spindle.

Referring to FIG. 17, another embodiment of the present invention is shown, where common reference numbers correspond to similar components/elements in FIGS. 12, 13 and 17. In FIG. 17, the first region 1072 has a first volume corresponding to cross sectional area $A_{entrance}$, and the second region 1074 has a second volume corresponding to cross sectional area $A_{exit}$, the second volume different than the first volume. For example, the first volume may be at least approximately twice the second volume. As another example, a ratio of the first volume to the second volume may be in the range of approximately 3 to 14. Further, as shown in FIG. 17, the second region 1074 may be generally located between boundaries of the first region 1072.

Figure 14:
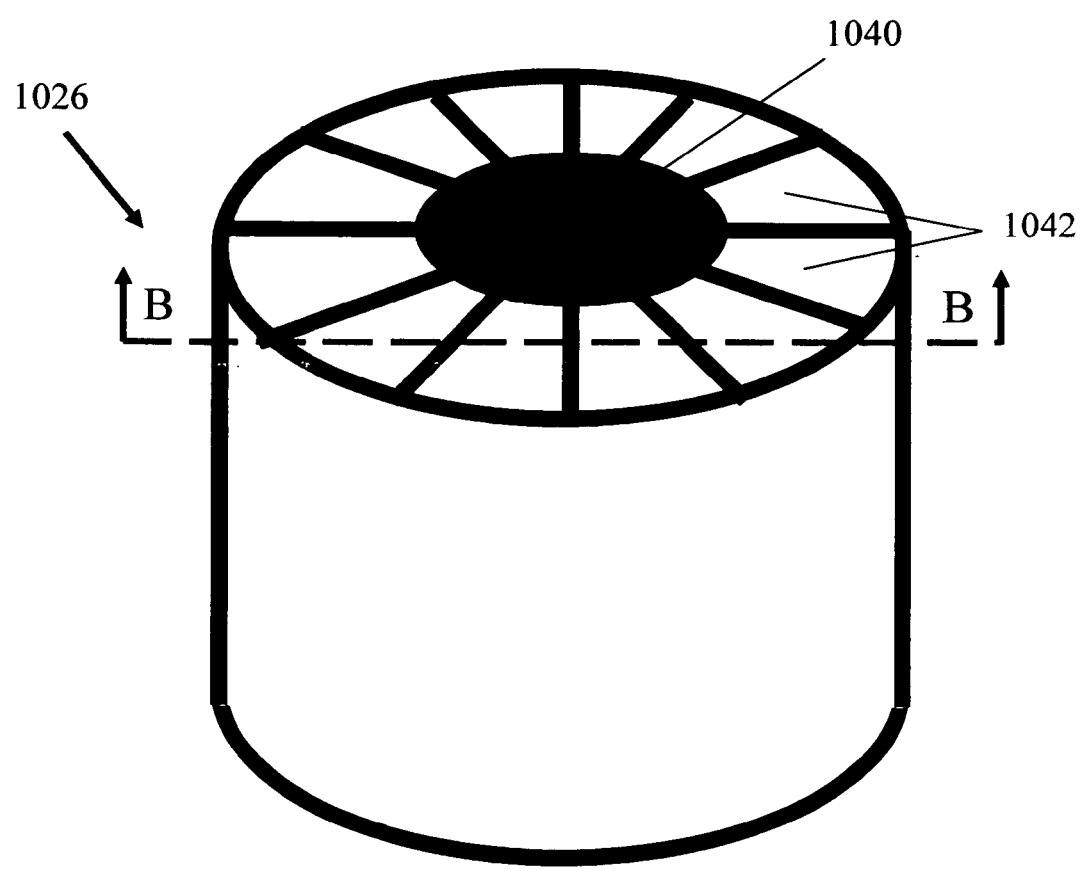
FIG. 14 is a perspective view of the spindle of the pressurizer shown in FIG. 12.
Figure 15:
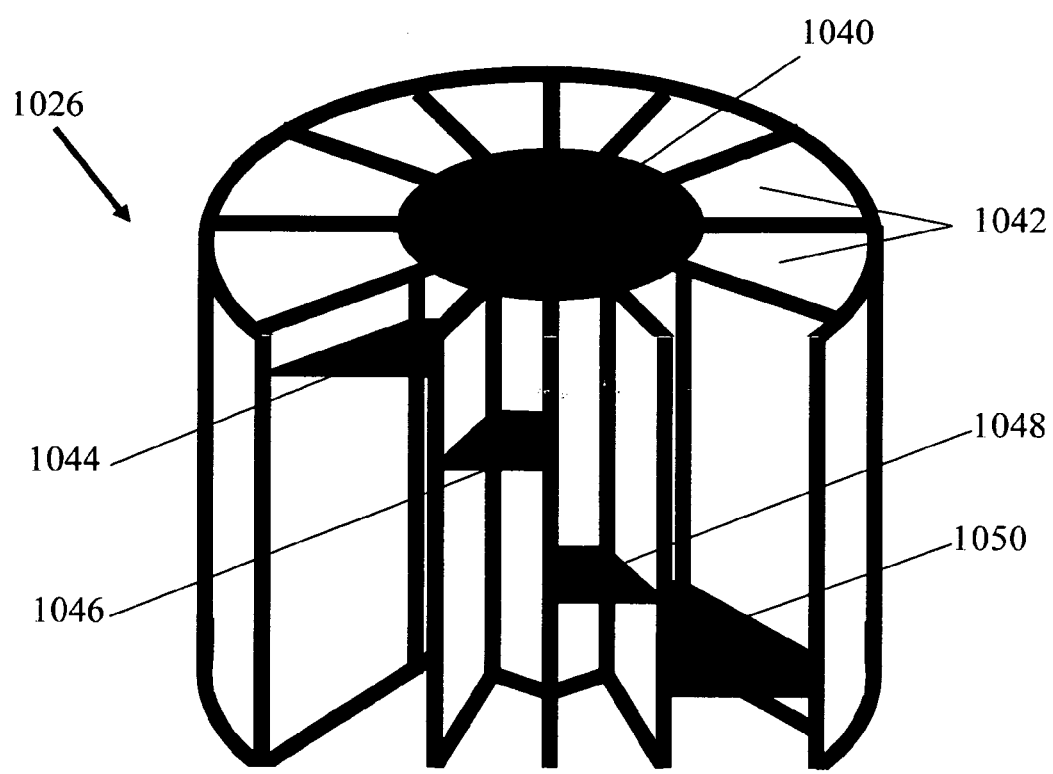
FIG. 15 shows a cross sectional view along section B—B of the spindle shown in FIG. 14.

Referring to FIG. 14, spindle 1026 includes a plurality of transfer chambers 1042 and a center 1040. Each complete rotation of the spindle 1026 is a complete cycle for each transfer chamber 1042. For each transfer chamber 1042, for a portion of each cycle, propellant flows inward from propellant conduit 1006 (in the direction of the arrow indicated as shown in FIGS. 12 and 13) and pressurant flows outward to exhaust conduit 1034; for another portion of the cycle, propellant flows outward to engine conduit 1032 and pressurant flows inward from pressurant conduit 1036. Now referring to FIG. 15, which shows a cross section of the spindle 1026 along section B—B in FIG. 14, each transfer chamber 1042 is an individual chamber divided from the next, so that the meniscus of propellant in each transfer chamber 1042 is potentially different. First meniscus 1044 is the meniscus in a transfer chamber that is just beginning the portion of the cycle in which propellant flows outward to engine conduit 1032 and pressurant flows inward from pressurant conduit 1036. Fourth meniscus 1050 is the meniscus in a transfer chamber that is just ending the portion of the cycle in which propellant flows outward to engine conduit 1032 and pressurant flows inward from pressurant conduit 1036. In this figure, propellant is flowing downward under the force of pressurant. Reference numbers 1044, 1046, 1048, and 1050 may also refer to movable partitions configured to separate the fluid propellant and the pressurant.

Figure 16:
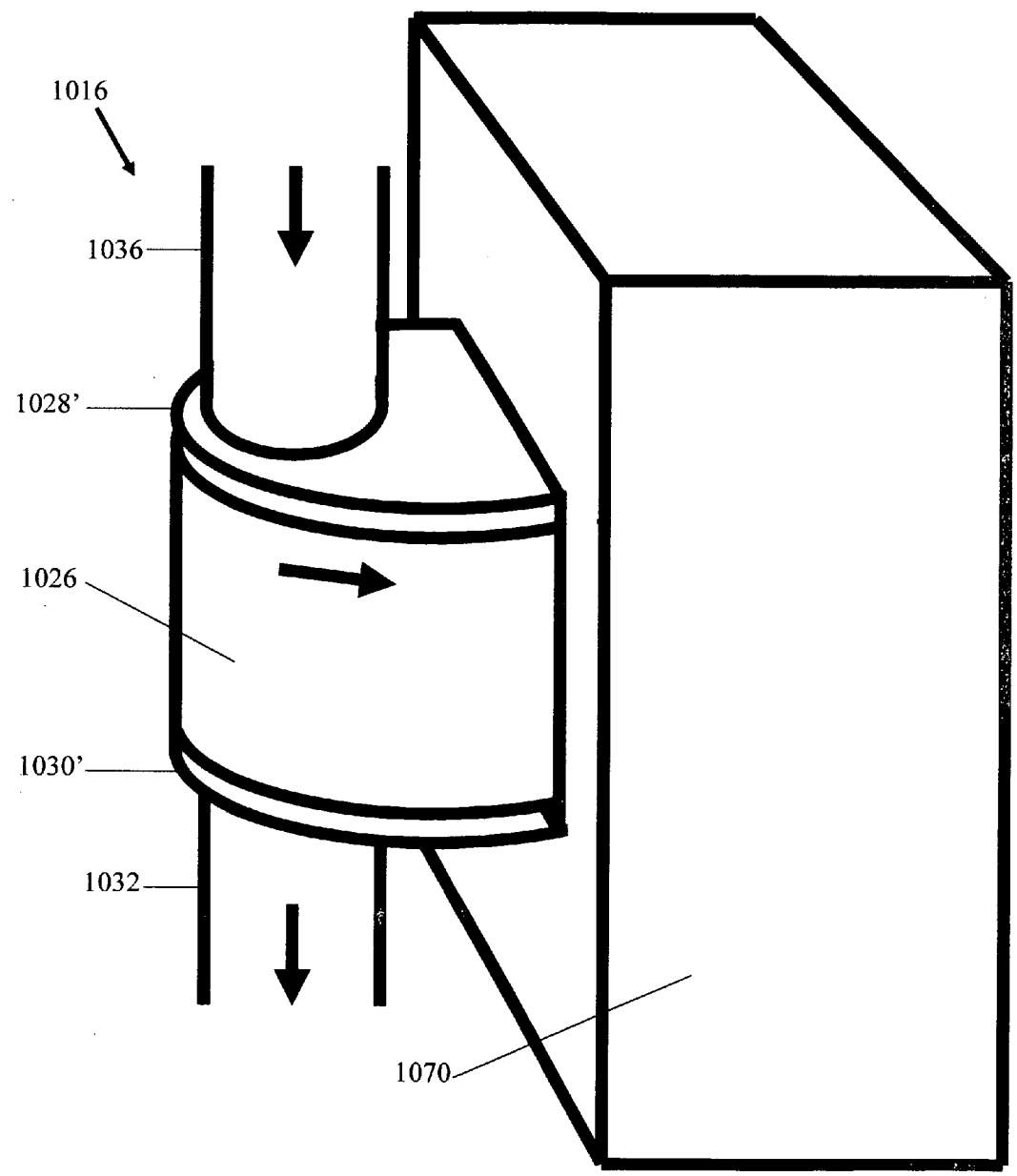
FIG. 16 shows a perspective view of a pressurizer according to one embodiment.

Referring to FIG. 16, another embodiment of the pressurizer of the present invention is shown, where common reference numbers between FIGS. 12 and 16 represent corresponding components/elements. One major difference is that the first region 1072 is built into or generally located internally to a storage tank 1070 of the propellant, and top chamber separator 1028' and bottom chamber separator 1030' are attached to the storage tank 1070.

I claim:

1. A pump for pumping a liquid fluid, comprising:
   a pressurant entrance configured for introduction of a pressurant;
   a pressurant exit configured for exit of the pressurant;
   a fluid entrance configured for introduction of the fluid;
   a fluid exit configured for exit of the fluid;
   a first region connected to the fluid entrance and the pressurant exit; and
   a second region connected to the pressurant entrance and the fluid exit,
   wherein the first region is configured to fill with the fluid,
   wherein the second region is configured to drain of the fluid by force of the pressurant while the first region fills with the fluid, and
   wherein the first region has a first volume and the second region has a second volume different than the first volume.

2. A rocket system comprising:
   the pump as claimed in claim 1;
   a storage tank of the liquid fluid connected to the pump; and
   a rocket engine connected to the pump.

3. The rocket system as in claim 2,
   wherein the first region comprises a first plurality of fluidly connected transfer chambers,
   wherein the second region comprises a second plurality of fluidly connected transfer chambers,
   wherein the transfer chambers are movable in a revolving cycle with respect to the first and second regions, and
   wherein the pump is configured so that the first region is not configured to drain of the fluid and the second region is not configured to fill with the fluid.

4. The rocket system as in claim 2, wherein the first volume is at least approximately twice the second volume.

5. The pump as in claim 1, wherein the second region is generally located between boundaries of the first region.

6. The pump as in claim 5, wherein the first region is generally located internally to a storage tank of the liquid fluid.

7. The pump as in claim 1, wherein a ratio of the first volume to the second volume is in the range of approximately 3 to 14.

8. The pump as in claim 1, wherein the first volume is at least approximately twice the second volume.

9. The pump as in claim 1, wherein the first and second regions are approximately parallel.

10. The pump as in claim 1, further comprising a movable partition configured to separate the fluid and the pressurant.

11. A pump for pumping a liquid fluid, comprising:
    a pressurant entrance configured for introduction of a pressurant;
    a pressurant exit configured for exit of the pressurant;
    a fluid entrance configured for introduction of the fluid;
    a fluid exit configured for exit of the fluid;
    a first region connected to the fluid entrance and the pressurant exit; and
    a second region connected to the pressurant entrance and the fluid exit, the second region having a second volume different than a first volume of the first region,
    wherein the second region is configured to drain of the fluid by force of the pressurant while the first region fills with the fluid.

12. The pump as in claim 11, wherein the second region is generally located between boundaries of the first region.

13. The pump as in claim 11, wherein the first region is generally located internally to a storage tank of the liquid fluid.

14. The pump as in claim 11, wherein the first volume is at least approximately twice the second volume.

15. The pump as in claim 11, wherein a ratio of the first volume to the second volume is in the range of approximately 3 to 14.

16. The pump as in claim 11, wherein the first and second regions are approximately parallel.

17. The pump as in claim 11, further comprising a movable partition configured to separate the fluid and the pressurant.

18. A rocket system comprising:
    the pump as claimed in claim 11;
    a storage tank of the liquid fluid connected to the pump; and
    a rocket engine connected to the pump.

19. The rocket system as in claim 18,
    wherein the first region comprises a first plurality of fluidly connected transfer chambers,
    wherein the second region comprises a second plurality of fluidly connected transfer chambers,
    wherein the transfer chambers are movable in a revolving cycle with respect to the first and second regions, and
    wherein the pump is configured so that the first region is not configured to drain of the fluid and the second region is not configured to fill with the fluid.

20. The rocket system as in claim 18, wherein the first volume is at least approximately twice the second volume.

\* \* \* \* \*